US011567881B1

(12) United States Patent
Bilski et al.

(10) Patent No.: US 11,567,881 B1
(45) Date of Patent: Jan. 31, 2023

(54) EVENT-BASED DEBUG, TRACE, AND PROFILE IN DEVICE WITH DATA PROCESSING ENGINE ARRAY

(71) Applicant: Xilinx, Inc., San Jose, CA (US)

(72) Inventors: Goran H. K. Bilski, Molndal (SE); David Clarke, Dublin (IE); Baris Ozgul, Dundrum (IE); Jan Langer, Chemnitz (DE); Juan J. Noguera Serra, San Jose, CA (US)

(73) Assignee: XILINX, INC., San Jose, CA (US)

( * ) Notice: Subject to any disclaimer, the term of this patent is extended or adjusted under 35 U.S.C. 154(b) by 172 days.

(21) Appl. No.: 15/944,602

(22) Filed: Apr. 3, 2018

(51) Int. Cl.
*G06F 13/10* (2006.01)
*G06F 13/16* (2006.01)

(52) U.S. Cl.
CPC ............ *G06F 13/102* (2013.01); *G06F 13/16* (2013.01); *G06F 2213/16* (2013.01); *G06F 2213/2412* (2013.01)

(58) Field of Classification Search
CPC ... H04L 49/109; G06F 13/36; G06F 13/4068; G06F 15/7842; G06F 15/7807; G06F 13/1668; G06F 13/1663; G06F 13/1657; G06F 13/4282; G06F 13/102; G06F 13/16; G06F 9/44505
See application file for complete search history.

(56) References Cited

U.S. PATENT DOCUMENTS

| 3,776,137 | A | 12/1973 | Abbott |
| 6,091,263 | A | 7/2000 | New et al. |
| 6,150,839 | A | 11/2000 | New et al. |
| 6,204,687 | B1 | 3/2001 | Schultz et al. |
| 6,462,579 | B1 | 10/2002 | Camilleri et al. |
| 6,526,557 | B1 | 2/2003 | Young et al. |
| 6,759,869 | B1 | 7/2004 | Young et al. |
| 6,810,514 | B1 | 10/2004 | Alfke et al. |
| 6,836,842 | B1 | 12/2004 | Guccione et al. |
| 6,907,595 | B2 | 6/2005 | Curd et al. |
| 7,024,651 | B1 | 4/2006 | Camilleri et al. |
| 7,057,413 | B1 | 6/2006 | Young et al. |
| 7,124,338 | B1 | 10/2006 | Mark et al. |
| 7,224,184 | B1 | 5/2007 | Levi et al. |
| 7,302,625 | B1 | 11/2007 | Payakapan et al. |

(Continued)

OTHER PUBLICATIONS

"BlueField Multicore System on Chip," Mellanox Technologies, Ltd. © 2017, Product Brief 52964, Rev. 2.4, 4 pg.

(Continued)

*Primary Examiner* — Ernest Unelus
(74) *Attorney, Agent, or Firm* — Patterson + Sheridan, LLP

(57) ABSTRACT

A device may include an array of data processing engines (DPEs) on a die and an event broadcast network. Each of the DPEs includes a core, a memory module, event logic in at least one of the core or the memory module, and an event broadcast circuitry coupled to the event logic. The event logic is capable of detecting an occurrence of one or more events in the core or the memory module. The event broadcast circuitry is capable of receiving an indication of a detected event detected by the event logic. The event broadcast network includes interconnections between the event broadcast circuitry of the DPEs. Detected events can trigger or initiate various responses, such as debugging, tracing, and profiling.

20 Claims, 12 Drawing Sheets

(56) References Cited

U.S. PATENT DOCUMENTS

| | | | |
|---|---|---|---|
| 7,477,072 | B1 | 1/2009 | Kao et al. |
| 7,478,357 | B1 | 1/2009 | Mason et al. |
| 7,482,836 | B2 | 1/2009 | Levi et al. |
| 7,509,617 | B1 | 3/2009 | Young |
| 7,518,396 | B1 | 4/2009 | Kondapalli et al. |
| 7,546,572 | B1 | 6/2009 | Ballagh et al. |
| 7,619,442 | B1 | 11/2009 | Mason et al. |
| 7,640,527 | B1 | 12/2009 | Dorairaj et al. |
| 7,724,815 | B1 | 5/2010 | Raha et al. |
| 7,746,099 | B1 | 6/2010 | Chan et al. |
| 8,102,188 | B1 | 1/2012 | Chan et al. |
| 8,250,342 | B1 | 8/2012 | Kostarnov et al. |
| 8,359,448 | B1 | 1/2013 | Neuendorffer |
| 8,415,974 | B1 | 4/2013 | Lysaght |
| 8,719,750 | B1 | 5/2014 | Balzli, Jr. |
| 8,796,539 | B2 | 8/2014 | Asaumi et al. |
| 8,928,351 | B1 | 1/2015 | Konduru |
| 9,081,634 | B1 | 7/2015 | Simkins et al. |
| 9,722,613 | B1 | 8/2017 | Schultz et al. |
| 2017/0220499 | A1* | 8/2017 | Gray ................ G06F 13/36 |
| 2018/0287964 | A1* | 10/2018 | Gray ................ H04L 49/109 |
| 2019/0155666 | A1* | 5/2019 | Dobbs ............... G06F 9/44505 |

OTHER PUBLICATIONS

"NP-5 Network Processor," Mellanox Technologies, Ltd. © 2017, Product Brief 53042, Rev. 2.1, 2 pg.
"Tile-Gx672 Processor," Mellanox Technologies, Ltd. © 2015-2016, Product Brief 041, Rev. 4.0, 2 pg.
"Kalray NVMe-oF Target Controller Solutions," KALRAY Corporation White Paper, Dec. 18, 2017, 14 pg.
"EZ Chip Tile-Gx72 Processor Product Brief," EZchip Semiconductor, Inc. © 2015, Product Brief 041, Re. 4.0, Feb. 14, 2015, 2 pg.
Schooler, R., "Tile processors: Many-core for embedded and cloud computing," In Workshop on High Performance Embedded Computing, Sep. 15, 2010, 35 pg.
Doud, B., "Accelerating the data plane with the tile-mx manycore processor," In Linley Data Center Conference, Feb. 25-26, 2015, 19 pg.
Wentzlahf, D., et al., "On-chip interconnection architecture of the tile processor," IEEE Micro, vol. 27, No. 5, Sep. 2007, pp. 15-31.
"MPPA Processors for Autonomous Driving," KALRAY Corporation White Paper, May 25, 2017, 18 pg.
"Deep Learning for High-Performance Embedded Applications," KALRAY Corporation White Paper, Mar. 16, 2017,19 pg.
"UltraScale Architecture DSP Slice," Xilinx, Inc. User Guide, UG579 (v1.5) Oct. 18, 2017, 74 pg.

* cited by examiner

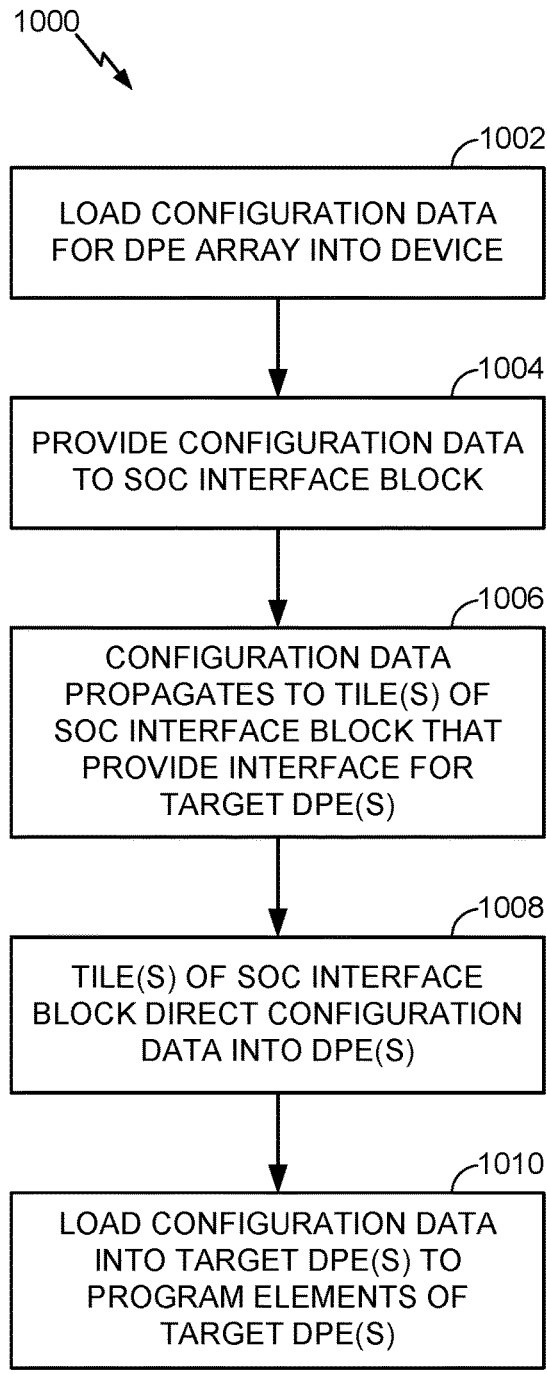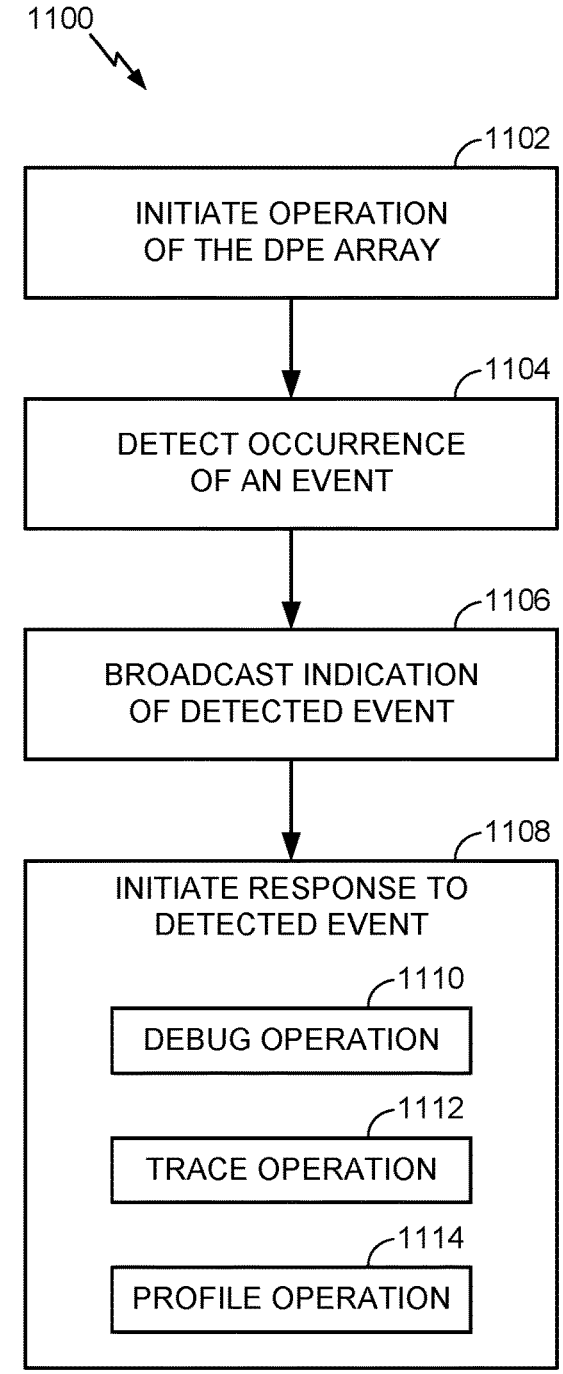
FIG. 10
FIG. 11

EVENT-BASED DEBUG, TRACE, AND PROFILE IN DEVICE WITH DATA PROCESSING ENGINE ARRAY

TECHNICAL FIELD

This disclosure relates to integrated circuit devices (devices) and, more particularly, to devices that include data processing engines and/or a data processing engine array with debug, tracing, and profiling based on event detection and broadcasting.

BACKGROUND

A programmable integrated circuit (IC) refers to a type of IC that includes programmable circuitry. An example of a programmable IC is a field programmable gate array (FPGA). An FPGA is characterized by the inclusion of programmable circuit blocks. Examples of programmable circuit blocks include, but are not limited to, input/output blocks (IOBs), configurable logic blocks (CLBs), dedicated random access memory blocks (BRAM), digital signal processing blocks (DSPs), processors, clock managers, and delay lock loops (DLLs).

Circuit designs may be physically implemented within the programmable circuitry of a programmable IC by loading configuration data, sometimes referred to as a configuration bitstream, into the device. The configuration data may be loaded into internal configuration memory cells of the device. The collective states of the individual configuration memory cells determine the functionality of the programmable IC. For example, the particular operations performed by the various programmable circuit blocks and the connectivity between the programmable circuit blocks of the programmable IC are defined by the collective states of the configuration memory cells once loaded with the configuration data.

SUMMARY

Examples described herein relate to a device that includes an array of data processing engines (DPEs), where each DPE includes a core, a memory module, and a DPE interconnect. Each DPE further includes event processing circuitry including event logic and event broadcast circuitry, such as illustrated in FIG. 4. Event logic is configurable to detect various events that can occur in the respective DPE. Detected events, whether generated internally to the DPE or received from another array component, can be broadcast through event broadcast circuitry to other array components. Detected events can trigger or initiate various responses, such as debugging, tracing, and profiling.

In one or more embodiments, a device may include an array of DPEs on a die and an event broadcast network. Each of the DPEs includes a core, a memory module, event logic in at least one of the core or the memory module, and an event broadcast circuitry coupled to the event logic. The event logic is capable of detecting an occurrence of one or more events in the core or the memory module. The event broadcast circuitry is capable of receiving an indication of a detected event detected by the event logic. The event broadcast network includes interconnections between the event broadcast circuitry of the DPEs.

One or more embodiments may include a method for operating a device. A plurality of DPEs of an array of DPEs on a die are operated. Each of the plurality of DPEs include a core and a memory module. During operation of a first DPE of the plurality of DPEs, an occurrence of an event is detected in the core or the memory module of the first DPE by event logic in the first DPE. An indication of the detected event is broadcasted from the first DPE to at least a second DPE of the plurality of DPEs via an event broadcast network. The event broadcast network includes interconnected event broadcast circuitry of the plurality of DPEs.

In one or more embodiments, a device may include an array of DPEs on a die. Each of the DPEs includes a core, a memory module, core event logic in the core, memory event logic in the memory module, a first event broadcast circuitry connected to the core event logic, and a second event broadcast circuitry connected to the memory event logic. The core event logic is configurable to detect an occurrence of first one or more events in the core, and the first one or more events are defined by data written to first one or more configuration registers. The memory event logic is configurable to detect an occurrence of second one or more events in the memory module, and the second one or more events are defined by data written to second one or more configuration registers. The first event broadcast circuitry is configurable to selectively propagate a first received signal based on data written to third one or more configuration registers, and the first event broadcast circuitry is further configurable to propagate the first received signal selectively in one or more predefined directions based on data written to the third one or more configuration registers. The second event broadcast circuitry is configurable to selectively propagate a second received signal based on data written to fourth one or more configuration registers, and the second event broadcast circuitry is further configurable to propagate the second received signal selectively in one or more predefined directions based on data written to the fourth one or more configuration registers. The first event broadcast circuitry is connected to the second event broadcast circuitry. The first event broadcast circuitry and the second event broadcast circuitry of the DPEs are interconnected to form an event broadcast network.

This Summary section is provided merely to introduce certain concepts and not to identify any key or essential features of the claimed subject matter. Other features of the example arrangements will be apparent from the accompanying drawings and from the following detailed description.

BRIEF DESCRIPTION OF THE DRAWINGS

The example arrangements are illustrated by way of example in the accompanying drawings. The drawings, however, should not be construed to be limiting of the example arrangements to only the particular implementations shown. Various aspects and advantages will become apparent upon review of the following detailed description and upon reference to the drawings.

FIG. 10 illustrates an example method of configuring a DPE array.

FIG. 11 illustrates an example method of operating a device that includes a DPE array.

DETAILED DESCRIPTION

Figure 1:
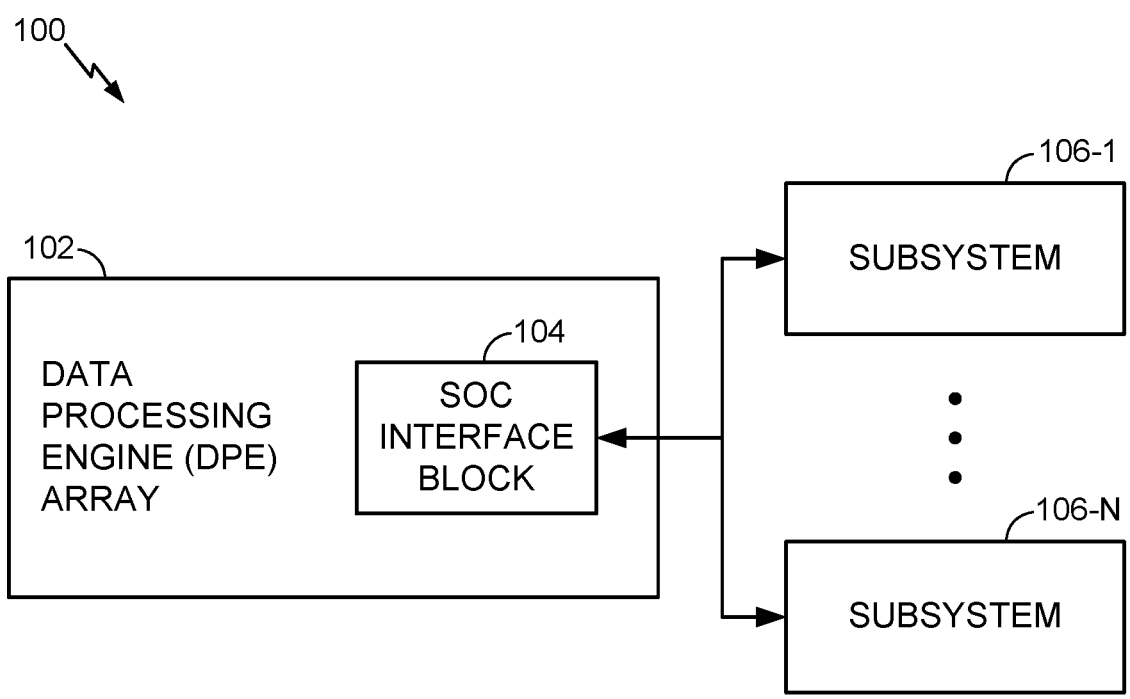
FIG. 1 illustrates an example of a device including a data processing engine (DPE) array.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuit devices (devices) that include one or more data processing engines (DPEs) and/or DPE arrays. A DPE array refers to a plurality of hardwired circuit blocks. The plurality of circuit blocks may be programmable. A DPE array may include a plurality of DPEs and a System-on-Chip (SoC) interface block. In general, a DPE includes a core that is capable of providing data processing capabilities. A DPE may also include a memory module that is accessible by the core or cores in the DPE.

A DPE further may include a DPE interconnect. The DPE interconnect refers to circuitry that is capable of implementing communications with other DPEs of a DPE array and/or communication with different subsystems of the device including the DPE array. The DPE interconnect further may support configuration of the DPE. In particular embodiments, the DPE interconnect is capable of conveying control data and/or debugging data.

A DPE may further include event logic that is configurable to detect events within the DPE. The core of the DPE may include event logic, and the memory module of the DPE may include other event logic. Each of the event logic may be configurable to detect events based on conditions written to one or more configuration registers of the DPE. When event logic detects the occurrence of an event, the detected event can be broadcast to other DPEs within the DPE array and/or to other components or subsystems. The detected event can be broadcast in the DPE array through interconnected event broadcast circuitry, which event broadcast circuitry can be configurable, based on configuration data written to corresponding configuration registers, to selectively broadcast the detected event to another, e.g., DPE and/or to broadcast the detected event in one or more predefined directions. The interconnected event broadcast circuitry can be independent of the DPE interconnect. Further, the detected event, whether detected internally in the DPE or received by the DPE from another component (e.g., another DPE), can cause the event logic and/or other logic in the DPE to trigger some response, which may be beneficial for debugging, tracing, and profiling.

A DPE array may be utilized with, and coupled to, any of a variety of different subsystems within the device. Such subsystems may include, but are not limited to, processor systems and/or programmable logic, which may be interconnected via a Network-on-Chip (NoC). In particular embodiments, the NoC may be programmable. Further examples of subsystems that may be included in a device and coupled to a DPE array may include, but are not limited to, an application-specific integrated circuit (ASIC), hardwired circuit blocks, analog and/or mixed signal circuitry, and/or general-purpose processors (e.g., central processing units or CPUs). An example of a CPU is a processor having an x86 type of architecture. Within this specification, the term "ASIC" may refer to an IC, a die, and/or a portion of a die that includes application-specific circuitry in combination with another type or types of circuitry; and/or to an IC and/or die that is formed entirely of application-specific circuitry.

A DPE array as described within this disclosure as an example, but not by way of limitation, is capable of implementing an optimized digital signal processing (DSP) architecture. The DSP architecture is capable of efficiently performing any of a variety of different operations. Examples of the types of operations that may be performed by the architecture include, but are not limited to, operations relating to wireless radio, decision feedback equalization (DFE), 5G/baseband, wireless backhaul, machine learning, automotive driver assistance, embedded vision, cable access, and/or radar. A DPE array as described herein is capable of performing such operations while consuming less power than other solutions that utilize conventional programmable (e.g., FPGA type) circuitry. Further, a DPE array-based solution may be implemented using less area of a die than other solutions that utilize conventional programmable circuitry. The DPE array is further capable of performing operations as described herein while meeting predictable and guaranteed data throughput and latency metrics.

Further aspects of the example arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a device 100 including a DPE array 102. In the example of FIG. 1, DPE array 102 includes a SoC interface block 104. Device 100 also includes one or more subsystems 106-1 through 106-N. In one or more embodiments, device 100 is implemented as a System-on-Chip (SoC) type of device. In general, a SoC refers to an IC that includes two or more subsystems capable of interacting with one another. As an example, a SoC may include a processor that executes program code and one or more other circuits. The other circuits may be implemented as hardwired circuitry, programmable circuitry, other subsystems, and/or any combination thereof. The circuits may operate cooperatively with one another and/or with the processor.

DPE array 102 is formed of a plurality of interconnected DPEs. Each of the DPEs is a hardwired circuit block. Each DPE may be programmable. SoC interface block 104 may include one or more tiles. Each of the tiles of SoC interface block 104 may be hardwired. Each tile of SoC interface block 104 may be programmable. SoC interface block 104 provides an interface between DPEs of the DPE array 102 and other portions of a SoC such as subsystems 106 of device 100. Subsystems 106-1 through 106-N may represent, for example, one or more or any combination of processors and/or processor systems (e.g., CPUs, general-purpose processors, and/or graphics processing units (GPUs)), programmable logic, ASICs, analog and/or mixed signal circuitry, and/or hardwired circuit blocks.

In one or more embodiments, device 100 is implemented using a single die architecture. In that case, DPE array 102 and at least one subsystem 106 may be included or implemented in a single die. In one or more other embodiments, device 100 is implemented using a multi-die architecture. In that case, DPE array 102 and subsystems 106 may be implemented across two or more dies. For example, DPE array 102 may be implemented in one die while subsystems 106 are implemented in one or more other dies. In another example, SoC interface block 104 may be implemented in a different die than the DPEs of DPE array 102. In yet another example, DPE array 102 and at least one subsystem 106 may be implemented in a same die while other subsystems and/or other DPE arrays are implemented in other dies.

Figure 2:
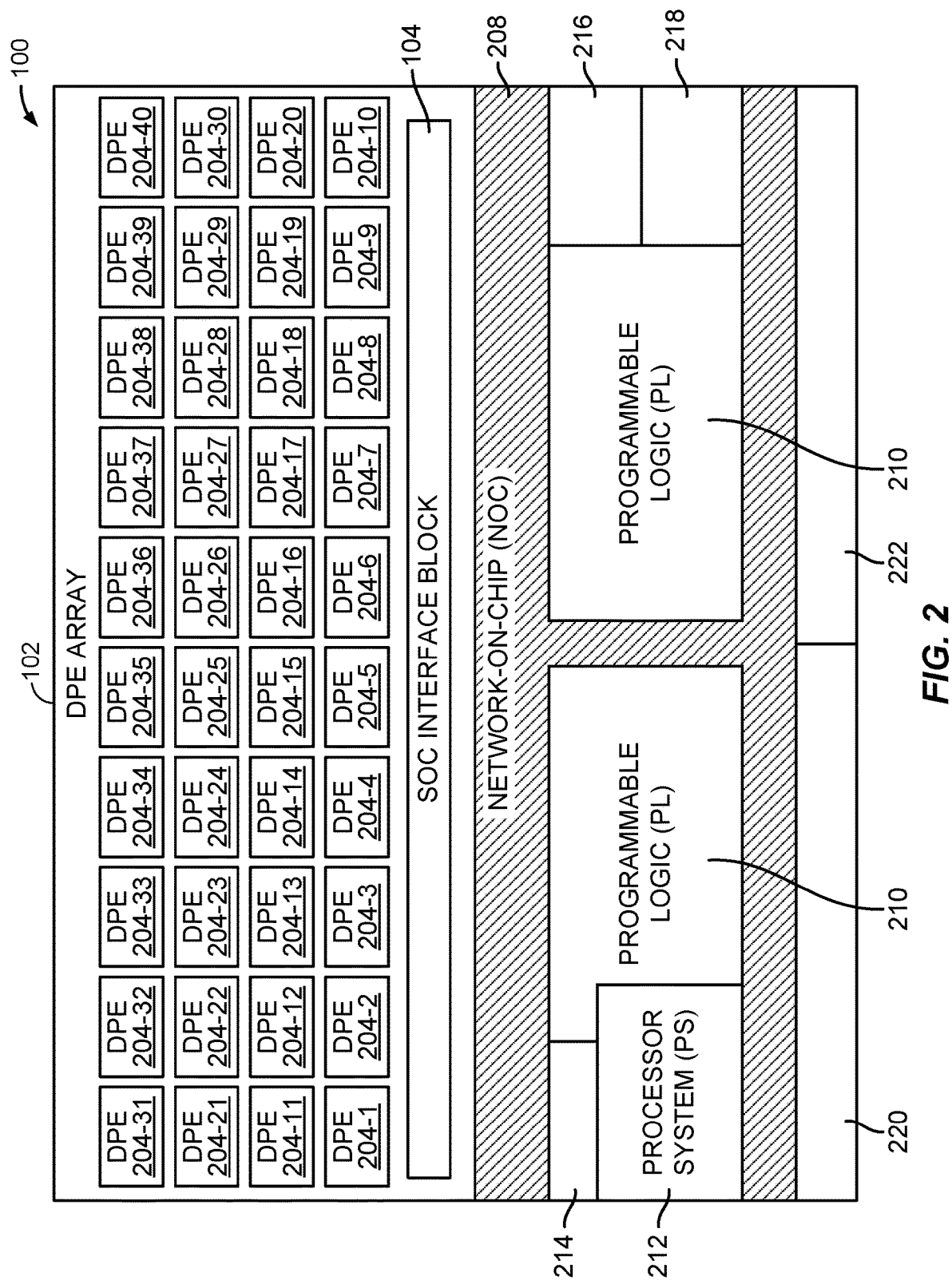
FIG. 2 illustrates another example architecture for a device including a DPE array.

FIG. 2 illustrates another example architecture for device 100. In the example of FIG. 2, DPE array 102 is implemented as a two-dimensional array of DPEs 204 that includes SoC interface block 104. DPE array 102 may be implemented using any of a variety of different architectures to be described herein in greater detail below. For purposes of illustration and not limitation, FIG. 2 illustrates DPEs 204 arranged in aligned rows and aligned columns. In other embodiments, however, DPEs 204 may be arranged where DPEs in selected rows and/or columns are horizontally inverted or flipped relative to DPEs in adjacent rows and/or columns. In one or more other embodiments, rows and/or columns of DPEs may be offset relative to adjacent rows and/or columns. One or more or all DPEs 204 may be implemented to include a single core as generally described in connection with FIG. 3 or to include two or more cores.

SoC interface block 104 is capable of coupling DPEs 204 to one or more other subsystems of device 100. In one or more embodiments, SoC interface block 104 is coupled to adjacent DPEs 204. For example, SoC interface block 104 may be directly coupled to each DPE 204 in the bottom row of DPEs in DPE array 102. In illustration, SoC interface block 104 may be directly connected to DPE 204-1, 204-2, 204-3, 204-4, 204-5, 204-6, 204-7, 204-8, 204-9, and 204-10.

FIG. 2 is provided for purposes of illustration. In other embodiments, SoC interface block 104 may be located at the top of DPE array 102, to the left of DPE array 102 (e.g., as a column), to the right of DPE array 102 (e.g., as a column), or at multiple locations in and around DPE array 102 (e.g., as one or more intervening rows and/or columns within DPE array 102). Depending upon the layout and location of SoC interface block 104, the particular DPEs coupled to SoC interface block 104 may vary.

For purposes of illustration and not limitation, if SoC interface block 104 is located to the left of DPEs 204, SoC interface block 104 may be directly coupled to the left column of DPEs including DPE 204-1, DPE 204-11, DPE 204-21, and DPE 204-31. If SoC interface block 104 is located to the right of DPEs 204, SoC interface block 104 may be directly coupled to the right column of DPEs including DPE 204-10, DPE 204-20, DPE 204-30, and DPE 204-40. If SoC interface block 104 is located at the top of DPEs 204, SoC interface block 104 may be coupled to the top row of DPEs including DPE 204-31, DPE 204-32, DPE 204-33, DPE 204-34, DPE 204-35, DPE 204-36, DPE 204-37, DPE 204-38, DPE 204-39, and DPE 204-40. If SoC interface block 104 is located at multiple locations, the particular DPEs that are directly connected to SoC interface block 104 may vary. For example, if SoC interface block is implemented as a row and/or column within DPE array 102, the DPEs that are directly coupled to SoC interface block 104 may be those that are adjacent to SoC interface block 104 on one or more or each side of SoC interface block 104.

DPEs 204 are interconnected by DPE interconnects (not shown), which, when taken collectively, form a DPE interconnect network. As such, SoC interface block 104 is capable of communicating with any DPE 204 of DPE array 102 by communicating with one or more selected DPEs 204 of DPE array 102 directly connected to SoC interface block 104 and utilizing the DPE interconnect network formed of DPE interconnects implemented within each DPE 204.

SoC interface block 104 is capable of coupling each DPE 204 within DPE array 102 with one or more other subsystems of device 100. For purposes of illustration, device 100 includes subsystems (e.g., subsystems 106) such as programmable logic (PL) 210, a processor system (PS) 212, and/or any of hardwired circuit blocks 214, 216, 218, 220, and/or 222, which can be interconnected via a NoC 208. SoC interface block 104 is capable of establishing connections between selected DPEs 204 and PL 210. SoC interface block 104 is also capable of establishing connections between selected DPEs 204 and NoC 208. Through NoC 208, the selected DPEs 204 are capable of communicating with PS 212 and/or hardwired circuit blocks 220 and 222. Selected DPEs 204 are capable of communicating with hardwired circuit blocks 214-218 via SoC interface block 104 and PL 210. In particular embodiments, SoC interface block 104 may be coupled directly to one or more subsystems of device 100. For example, SoC interface block 104 may be coupled directly to PS 212 and/or to other hardwired circuit blocks. In particular embodiments, hardwired circuit blocks 214-222 may be considered examples of ASICs.

In one or more embodiments, DPE array 102 includes a single clock domain. Other subsystems such as NoC 208, PL 210, PS 212, and the various hardwired circuit blocks may be in one or more separate or different clock domain(s). Still, DPE array 102 may include additional clocks that may be used for interfacing with other ones of the subsystems. In particular embodiments, SoC interface block 104 includes a clock signal generator that is capable of generating one or more clock signals that may be provided or distributed to DPEs 204 of DPE array 102.

DPE array 102 may be programmed by loading configuration data into internal configuration memory cells (also referred to herein as "configuration registers") that define connectivity among DPEs 204 and SoC interface block 104 and how DPEs 204 and SoC interface block 104 operate. For example, for a particular DPE 204 or group of DPEs 204 to communicate with a subsystem, the DPE(s) 204 and SoC interface block 104 are programmed to do so. Similarly, for one or more particular DPEs 204 to communicate with one or more other DPEs 204, the DPEs are programmed to do so. DPE(s) 204 and SoC interface block 104 may be programmed by loading configuration data into configuration registers within DPE(s) 204 and SoC interface block 104, respectively. In another example, the clock signal generator, being part of SoC interface block 104, may be programmable using configuration data to vary the clock frequencies provided to DPE array 102.

NoC 208 provides connectivity to PL 210, PS 212, and to selected ones of the hardwired circuit blocks (e.g., circuit blocks 220 and 222). In the example of FIG. 2, NoC 208 is programmable. In the case of a programmable NoC used with other programmable circuitry, the nets that are to be routed through NoC 208 are unknown until a user circuit design is created for implementation within device 100. NoC 208 may be programmed by loading configuration data into internal configuration registers that define how elements within NoC 208 such as switches and interfaces are configured and operate to pass data from switch to switch and among the NoC interfaces.

NoC 208 is fabricated as part of device 100 and while not physically modifiable, may be programmed to establish connectivity between different master circuits and different slave circuits of a user circuit design. In this regard, NoC 208 is capable of adapting to different circuit designs, where each different circuit design has different combinations of master circuits and slave circuits implemented at different locations in device 100 that may be coupled by NoC 208. NoC 208 may be programmed to route data, e.g., application data and/or configuration data, among the master and slave circuits of the user circuit design. For example, NoC 208 may be programmed to couple different user-specified circuitry implemented within PL 210 with PS 212, with different ones of DPEs 204 via SoC interface block 104, with different hardwired circuit blocks, and/or with different circuits and/or systems external to device 100.

PL 210 is circuitry that may be programmed to perform specified functions. As an example, PL 210 may be implemented as field programmable gate array (FPGA) circuitry. PL 210 may include an array of programmable circuit blocks. Examples of programmable circuit blocks within PL 210 include, but are not limited to, input/output blocks (IOBs), configurable logic blocks (CLBs), dedicated random access memory blocks (BRAM), digital signal processing blocks (DSPs), clock managers, and/or delay lock loops (DLLs).

Each programmable circuit block within PL 210 typically includes both programmable interconnect circuitry and programmable logic circuitry. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). The programmable logic circuitry implements the logic of a user design using programmable elements that may include, for example, look-up tables, registers, arithmetic logic, and so forth. The programmable interconnect and programmable logic circuitries may be programmed by loading configuration data into internal configuration memory cells that define how the programmable elements are configured and operate.

In the example of FIG. 2, PL 210 is shown in two separate sections. In another example, PL 210 may be implemented as a unified region of programmable circuitry. In still another example, PL 210 may be implemented as more than two different regions of programmable circuitry. The particular organization of PL 210 is not intended as a limitation.

In the example of FIG. 2, PS 212 is implemented as hardwired circuitry that is fabricated as part of device 100. PS 212 may be implemented as, or include, any of a variety of different processor types. For example, PS 212 may be implemented as an individual processor, e.g., a single core capable of executing program code. In another example, PS 212 may be implemented as a multi-core processor. In still another example, PS 212 may include one or more cores, modules, co-processors, interfaces, and/or other resources. PS 212 may be implemented using any of a variety of different types of architectures. Example architectures that may be used to implement PS 212 may include, but are not limited to, an ARM processor architecture, an x86 processor architecture, a GPU architecture, a mobile processor architecture, a DSP architecture, or other suitable architecture that is capable of executing computer-readable instructions or program code.

Circuit blocks 214-222 may be implemented as any of a variety of different hardwired circuit blocks. Hardwired circuit blocks 214-222 may be customized to perform specialized functions. Examples of circuit blocks 214-222 include, but are not limited to, input/output blocks (IOBs), transceivers, or other specialized circuit blocks. As noted, circuit blocks 214-222 may be considered examples of ASICs.

The example of FIG. 2 illustrates an architecture that may be implemented in a device that includes a single die. While DPE array 102 is illustrated as occupying the entire width of device 100, in other embodiments, DPE array 102 may occupy less than the entire width of device 100 and/or be located in a different region of device 100. Further, the number of DPEs 204 included may vary. As such, the particular number of columns and/or rows of DPEs 204 may vary from that illustrated in FIG. 2.

In one or more other embodiments, a device such as device 100 may include two or more DPE arrays 102 located in different regions of device 100. For example, an additional DPE array may be located below circuit blocks 220 and 222.

As noted, FIG. 2 illustrates an example architecture for a device that includes a single die. In one or more other embodiments, device 100 may be implemented as a multi-die device including one or more DPE arrays 102.

Using a DPE array as described herein in combination with one or more other subsystems, whether implemented in a single die device or a multi-die device, increases the processing capabilities of the device while keeping area usage and power consumption low. For example, one or more DPE array(s) may be used to hardware accelerate particular operations and/or to perform functions offloaded from one or more of the subsystems of the device described herein. When used with a PS, for example, the DPE array may be used as a hardware accelerator. The PS may offload operations to be performed by the DPE array or a portion thereof. In other examples, the DPE array may be used to perform computationally resource intensive operations such as generating digital pre-distortion to be provided to analog/mixed signal circuitry.

It should be appreciated that any of the various combinations of DPE array(s) and/or other subsystems described herein in connection with FIGS. 1 and/or 2 may be implemented in either a single die type of device or a multi-die type of device.

In the various examples described herein, the SoC interface block is implemented within the DPE array. In one or more other embodiments, the SoC interface block may be implemented external to the DPE array. For example, the SoC interface block may be implemented as a circuit block, e.g., a standalone circuit block, that is separate from the circuit block implementing the plurality of DPEs.

Figure 3:
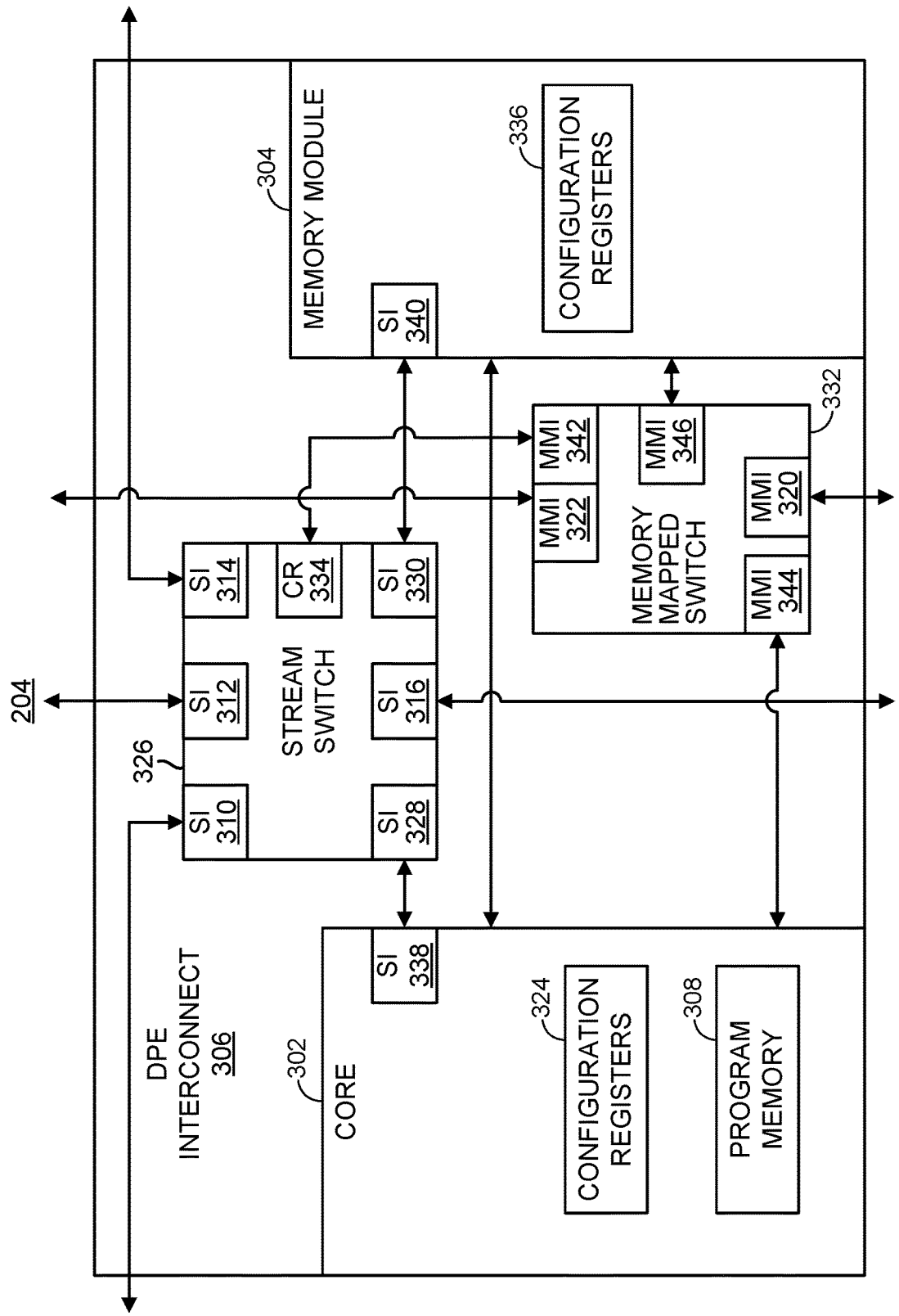
FIG. 3 illustrates an example architecture for a DPE of a DPE array.

FIG. 3 illustrates an example architecture for a DPE 204 of DPE array 102. In the example of FIG. 3, DPE 204 includes a core 302, a memory module 304, and DPE interconnect 306.

Core 302 provides the data processing capabilities of DPE 204. Core 302 may be implemented as any of a variety of different processing circuits. In the example of FIG. 3, core 302 includes an optional program memory 308. In one or more embodiments, core 302 is implemented as a processor that is capable of executing program code, e.g., computer readable instructions. In that case, program memory 308 is included and is capable of storing instructions that are executed by core 302. Core 302, for example, may be implemented as a CPU, a GPU, a DSP, a vector processor, or another type of processor that is capable of executing instructions. The core may be implemented using any of the various CPU and/or processor architectures described herein. In another example, core 302 is implemented as a very long instruction word (VLIW) vector processor or DSP.

In particular embodiments, program memory 308 is implemented as a dedicated program memory that is private to core 302. Program memory 308 may only be used by the core of the same DPE 204. Thus, program memory 308 may only be accessed by core 302 and is not shared with any other DPE or component of another DPE. Program memory 308 may include a single port for read and write operations. Program memory 308 may support program compression and is addressable using the memory mapped network portion of DPE interconnect 306 described in greater detail below. Via the memory mapped network of DPE interconnect 306, for example, program memory 308 may be loaded with program code that may be executed by core 302.

In one or more embodiments, program memory 308 is capable of supporting one or more error detection and/or error correction mechanisms. For example, program memory 308 may be implemented to support parity checking through the addition of parity bits. In another example, program memory 308 may be error-correcting code (ECC) memory that is capable of detecting and correcting various types of data corruption. In another example, program memory 308 may support both ECC and parity checking. The different types of error detection and/or error correction described herein are provided for purposes illustration and are not intended to be limiting of the embodiments described. Other error detection and/or error correction technologies may be used with program memory 308 other than those listed.

In one or more embodiments, core 302 may have a customized architecture to support an application-specific instruction set. For example, core 302 may be customized for wireless applications and be configured to execute wireless-specific instructions. In another example, core 302 may be customized for machine learning and be configured to execute machine learning-specific instructions.

In one or more other embodiments, core 302 is implemented as hardwired circuitry such as a hardened Intellectual Property (IP) core that is dedicated for performing a particular operation or operations. In that case, core 302 may not execute program code. In embodiments where core 302 does not execute program code, program memory 308 may be omitted. As an illustrative and non-limiting example, core 302 may be implemented as a hardened forward error correction (FEC) engine or other circuit block.

Core 302 may include configuration registers 324. Configuration registers 324 may be loaded with configuration data to control operation of core 302. In one or more embodiments, core 302 may be activated and/or deactivated based upon configuration data loaded into configuration registers 324. In the example of FIG. 3, configuration registers 324 are addressable (e.g., may be read and/or written) via the memory mapped network of DPE interconnect 306 described in greater detail below.

In one or more embodiments, memory module 304 is capable of storing data that is used by and/or generated by core 302. For example, memory module 304 is capable of storing application data. Memory module 304 may include a read/write memory such as a random-access memory. Accordingly, memory module 304 is capable of storing data that may be read and consumed by core 302. Memory module 304 is also capable of storing data (e.g., results) that are written by core 302.

In one or more other embodiments, memory module 304 is capable of storing data, e.g., application data, that may be used by and/or generated by one or more other cores of other DPEs within the DPE array. One or more other cores of DPEs may also read from and/or write to memory module 304. In particular embodiments, the other cores that may read from and/or write to memory module 304 may be cores of one or more neighboring DPEs. Another DPE that shares a border or boundary with DPE 204 (e.g., that is adjacent) is said to be a "neighboring" DPE relative to DPE 204. By allowing core 302 and one or more other cores from neighboring DPEs to read and/or write to memory module 304, memory module 304 implements a shared memory that supports communication among the different DPEs and/or cores capable of accessing memory module 304.

Referring to FIG. 2, for example, DPEs 204-14, 204-16, 204-5, and 204-25 are considered neighboring DPEs of DPE 204-15. In one example, the core within each of DPEs 204-16, 204-5, and 204-25 is capable of reading and writing to the memory module within DPE 204-15. In particular embodiments, only those neighboring DPEs that are adjacent to the memory module may access the memory module of DPE 204-15. For example, DPE 204-14, while adjacent to DPE 204-15, may not be adjacent to the memory module of DPE 204-15 since the core of DPE 204-15 may be located between the core of DPE 204-14 and the memory module of DPE 204-15. As such, in particular embodiments, the core of DPE 204-14 may not access the memory module of DPE 204-15.

In particular embodiments, whether a core of a DPE is able to access the memory module of another DPE depends upon the number of memory interfaces included in the memory module and whether such cores are connected to an available one of the memory interfaces of the memory module. In the example above, the memory module of DPE 204-15 includes four memory interfaces, where the core of each of DPEs 204-16, 204-5, and 204-25 is connected to such a memory interface. Core 302 within DPE 204-15 itself is connected to the fourth memory interface. Each memory interface may include one or more read and/or write channels. In particular embodiments, each memory interface includes multiple read channels and multiple write channels so that the particular core attached thereto is capable of reading and/or writing to multiple banks within memory module 304 concurrently.

In other examples, more than four memory interfaces may be available. Such other memory interfaces may be used to allow DPEs on a diagonal to DPE 204-15 to access the memory module of DPE 204-15. For example, if the cores in DPEs such as DPEs 204-14, 204-24, 204-26, 204-4, and/or 204-6 are also coupled to an available memory interface of the memory module in DPE 204-15, such other DPEs would also be capable of accessing the memory module of DPE 204-15.

Memory module 304 may include configuration registers 336. Configuration registers 336 may be loaded with configuration data to control operation of memory module 304. In the example of FIG. 3, configuration registers 336, 324 are addressable (e.g., may be read and/or written) via the memory mapped network of DPE interconnect 306 described in greater detail below.

In the example of FIG. 3, DPE interconnect 306 is specific to DPE 204. DPE interconnect 306 facilitates various operations including communication between DPE 204 and one or more other DPEs of DPE array 102 and/or communication with other subsystems of device 100. DPE interconnect 306 further enables configuration, control, and troubleshooting of DPE 204.

In particular embodiments, DPE interconnect 306 is implemented as an on-chip interconnect. An example of an on-chip interconnect is an Advanced Microcontroller Bus Architecture (AMBA) eXtensible Interface (AXI) bus (e.g., or switch). An AXI bus is an embedded microcontroller bus interface for use in establishing on-chip connections between circuit blocks and/or systems. An AXI bus is provided herein as an example of interconnect circuitry that may be used with the example arrangements described within this disclosure and, as such, is not intended as a limitation. Other examples of interconnect circuitry may include other types of buses, crossbars, and/or other types of switches.

In one or more embodiments, DPE interconnect 306 includes two different networks. The first network is capable of exchanging data with other DPEs of DPE array 102 and/or other subsystems of device 100. For example, the first network is capable of exchanging application data. The second network is capable of exchanging data such as configuration, control, and/or debugging data for the DPE (s).

In the example of FIG. 3, the first network of DPE interconnect 306 is formed of stream switch 326 and one or more stream interfaces. As pictured, stream switch 326 includes a plurality of stream interfaces (abbreviated as "SI" in FIG. 3). In one or more embodiments, each stream interface may include one or more masters (e.g., master interfaces or outputs) and/or one or more slaves (e.g., slave interfaces or inputs). Each master may be an independent output having a particular bit-width. For example, each master included in a stream interface may be an independent AXI master. Each slave may be an independent input having a particular bit-width. For example, each slave included in a stream interface may be an independent AXI slave.

Stream interfaces 310, 312, 314, and 316 are used to communicate with other DPEs in DPE array 102 and/or with SoC interface block 104. For example, each of stream interfaces 310, 312, 314, and 316 is capable of communicating in a different cardinal direction. In the example of FIG. 3, stream interface 310 communicates with a DPE to the left. Stream interface 312 communicates with a DPE above. Stream interface 314 communicates with a DPE to the right. Stream interface 316 communicates with a DPE or a tile of SoC interface block 104 below.

Stream interface 328 is used to communicate with core 302. Core 302, for example, includes a stream interface 338 that connects to stream interface 328 thereby allowing core 302 to communicate directly with other DPEs 204 via DPE interconnect 306. For example, core 302 may include instructions or hardwired circuitry that enable core 302 to send and/or receive data directly via stream interface 338. Stream interface 338 may be blocking or non-blocking. In one or more embodiments, in cases where core 302 attempts to read from an empty stream or write to a full stream, core 302 may stall. In other embodiments, attempting to read from an empty stream or write to a full stream may not cause core 302 to stall. Rather, core 302 may continue execution or operation.

Stream interface 330 is used to communicate with memory module 304. Memory module 304, for example, includes a stream interface 340 that connects to stream interface 330 thereby allowing other DPEs 204 to communicate with memory module 304 via DPE interconnect 306. Stream switch 326 is capable of allowing non-neighboring DPEs and/or DPEs that are not coupled to a memory interface of memory module 304 to communicate with core 302 and/or memory module 304 via the DPE interconnect network formed by the DPE interconnects of the respective DPEs 204 of DPE array 102.

Referring again to FIG. 2 and using DPE 204-15 as a point of reference to illustrate the orientation of FIG. 3, stream interface 310 is coupled to, and capable of, communicating with another stream interface located in the DPE interconnect of DPE 204-14. Stream interface 312 is coupled to, and capable of, communicating with another stream interface located in the DPE interconnect of DPE 204-25. Stream interface 314 is coupled to, and capable of, communicating with another stream interface located in the DPE interconnect of DPE 204-16. Stream interface 316 is coupled to, and capable of, communicating with another stream interface located in the DPE interconnect of DPE 204-5. As such, core 302 and/or memory module 304 are also capable of communicating with any of the DPEs within DPE array 102 via the DPE interconnects in the DPEs.

Stream switch 326 may also be used to interface to subsystems, such as PL 210, and/or to NoC 208. In general, stream switch 326 may be programmed to operate as a circuit-switching stream interconnect or a packet-switched stream interconnect. A circuit-switching stream interconnect is capable of implementing point-to-point, dedicated streams that are suitable for high-bandwidth communication among DPEs. A packet-switching stream interconnect allows streams to be shared to time-multiplex multiple logical streams onto one physical stream for medium bandwidth communication.

Stream switch 326 may include configuration registers (abbreviated as "CR" in FIG. 3) 334. Configuration data may be written to configuration registers 334 by way of the memory mapped network of DPE interconnect 306. The configuration data loaded into configuration registers 334 dictates which other DPEs and/or subsystems (e.g., PL 210 and/or PS 212) DPE 204 will communicate with and whether such communications are established as circuit-switched point-to-point connections or as packet-switched connections.

It should be appreciated that the number of stream interfaces illustrated in FIG. 3 is for purposes of illustration and not limitation. In other embodiments, stream switch 326 may include fewer stream interfaces. In particular embodiments, stream switch 326 may include more stream interfaces that facilitate connections to other components and/or subsystems in the device. For example, additional stream interfaces may couple to other non-neighboring DPEs such as DPEs 204-24, 204-26, 204-4, and/or 204-6. In one or more other embodiments, stream interfaces may be included to couple a DPE such as DPE 204-15 to other DPEs located one or more DPEs away. For example, one or more stream interfaces may be included that allow DPE 204-15 to couple directly to a stream interface in DPE 204-13, in DPE 204-16, or other non-neighboring DPE.

The second network of DPE interconnect 306 is formed of memory mapped switch 332. Memory mapped switch 332 includes a plurality of memory mapped interfaces (abbreviated as "MMI" in FIG. 3). In one or more embodiments, each memory mapped interface may include one or more masters (e.g., master interfaces or outputs) and/or one or more slaves (e.g., slave interfaces or inputs). Each master may be an independent output having a particular bit-width. For example, each master included in a memory mapped interface may be an independent AXI master. Each slave may be an independent input having a particular bit-width. For example, each slave included in a memory mapped interface may be an independent AXI slave.

In the example of FIG. 3, memory mapped switch 332 includes memory mapped interfaces 320, 322, 342, 344, and 346. It should be appreciated that memory mapped switch 332 may include additional or fewer memory mapped interfaces. For example, for each component of a DPE that may be read and/or written using memory mapped switch 332, memory mapped switch 332 may include a memory mapped interface coupled to such component. Further, the component itself may include a memory mapped interface coupled to the corresponding memory mapped interface in memory mapped switch 332 to facilitate reading and/or writing of memory addresses.

Memory mapped interfaces 320 and 322 may be used to exchange configuration, control, and debugging data for DPE 204. In the example of FIG. 3, memory mapped interface 320 is capable of receiving configuration data that is used to configure DPE 204. Memory mapped interface 320 may receive configuration data from a DPE located below DPE 204 and/or from SoC interface block 104. Memory mapped interface 322 is capable of forwarding configuration data received by memory mapped interface 320 to one or more other DPEs above DPE 204, to core 302 (e.g., to program memory 308 and/or to configuration registers 324), to memory module 304 (e.g., to memory within memory module 304 and/or to configuration registers 336), and/or to configuration registers 334 within stream switch 326.

In particular embodiments, memory mapped interface 320 communicates with a DPE or tile of SoC interface block 104 below to be described herein. Memory mapped interface 322 communicates with a DPE above. Referring again to FIG. 2 and using DPE 204-15 as a point of reference to illustrate the orientation of FIG. 3, memory mapped interface 320 is coupled to, and capable of, communicating with another memory mapped interface located in the DPE interconnect of DPE 204-5. Memory mapped interface 322 is coupled to, and capable of, communicating with another memory mapped interface located in the DPE interconnect of DPE 204-25. In one or more embodiments, memory mapped switch 332 conveys control, and/or debug data above and/or below to a DPE or tile of SoC interface block 104 (e.g., in the vertical direction).

Memory mapped interface 346 may be coupled to a memory mapped interface (not shown) in memory module 304 to facilitate reading and/or writing of configuration registers 336 and/or memory within memory module 304. Memory mapped interface 344 may be coupled to a memory mapped interface (not shown) in core 302 to facilitate reading and/or writing of program memory 308 and/or configuration registers 324. Memory mapped interface 342 may be coupled to configuration registers 334 to read and/or write to configuration register 334.

In the example of FIG. 3, memory mapped switch 332 is capable of communicating with circuitry above and below. In one or more other embodiments, memory mapped switch 332 includes additional memory mapped interfaces that are coupled to memory mapped interfaces of memory mapped switches of DPEs to the left and/or to the right. Using DPE 204-15 as a point of reference, such additional memory mapped interfaces may connect to memory mapped switches located in DPE 204-14 and/or DPE 204-16 thereby facilitating communication of configuration, control, and debug data among DPEs in the horizontal direction as well as the vertical direction.

In other embodiments, memory mapped switch 332 may include additional memory mapped interfaces connected to memory mapped switches in DPEs that are diagonal relative to DPE 204. For example, using DPE 204-15 as a point of reference, such additional memory mapped interfaces may be coupled to memory mapped switches located in DPE 204-24, 204-26, 204-4, and/or 204-6 thereby facilitating communication of configuration, control, and debug information among DPEs diagonally.

DPE interconnect 306 is coupled to the DPE interconnect of each neighboring DPE and/or tile of the SoC interface block 104 depending upon the location of DPE 204. Taken collectively, DPE interconnects of DPEs 204 form a DPE interconnect network (which may include the stream network and/or the memory mapped network). The configuration registers of the stream switches of each DPE may be programmed by loading configuration data through the memory mapped switches. Through configuration, the stream switches and/or stream interfaces are programmed to establish connections, whether packet-switched or circuit-switched, with other endpoints, whether in one or more other DPEs 204 and/or in one or more tiles of SoC interface block 104.

In one or more embodiments, DPE array 102 is mapped to the address space of a processor system such as PS 212. Accordingly, any configuration registers and/or memories within DPE 204 may be accessed via a memory mapped interface. For example, memory in memory module 304, program memory 308, configuration registers 324 in core 302, configuration registers 336 in memory module 304, and/or configuration registers 334 in the stream switch 326 may be read and/or written via memory mapped switch 332.

In the example of FIG. 3, memory mapped interfaces are capable of receiving configuration data for DPE 204. The configuration data may include program code that is loaded into program memory 308 (if included), configuration data for loading into configuration registers 324, 334, and/or 336, and/or data to be loaded into memory (e.g., memory banks) of memory module 304. In the example of FIG. 3, configuration registers 324, 334, and 336 are shown as being located within the particular circuit structures that the configuration registers are intended to control, e.g., core 302, stream switch 326, and memory module 304, respectively. The example of FIG. 3 is for purposes of illustration only and illustrates that elements within core 302, memory module 304, and/or stream switch 326 may be programmed by way of loading configuration data into the corresponding configuration registers. In other embodiments, the configuration registers may be consolidated within a particular region of DPE 204 despite controlling operation of components distributed throughout DPE 204.

Accordingly, stream switch 326 may be programmed by loading configuration data into configuration registers 334. The configuration data programs stream switch 326 and/or stream interfaces 310-316 and/or 328, 330 to operate as circuit-switching stream interfaces between two different DPEs and/or other subsystems or as packet-switching stream interfaces coupled to selected DPEs and/or other subsystems. Thus, connections established by stream switch 326 to other stream interfaces are programmed by loading suitable configuration data into configuration registers 334 to establish actual connections or application data paths within DPE 204, with other DPEs, and/or with other subsystems of device 100.

As noted, in other embodiments, additional memory mapped interfaces may be included to couple DPEs in the vertical direction as pictured and in the horizontal direction. Further, memory mapped interfaces may support bi-directional communication in the vertical and/or horizontal directions.

Memory mapped interfaces 320 and 322 are capable of implementing a shared, transaction switched network where transactions propagate from memory mapped switch to memory mapped switch. Each of the memory mapped switches, for example, is capable of dynamically routing transactions based upon addresses. Transactions may be stalled at any given memory mapped switch. Memory mapped interfaces 320 and 322 allow other subsystems of device 100 to access resources (e.g., components) of DPEs 204.

In particular embodiments, subsystems of device 100 are capable of reading the internal state of any register and/or memory element of a DPE via memory mapped interfaces 320 and/or 322. Through memory mapped interfaces 320 and/or 322, subsystems of device 100 are capable of reading and/or writing to program memory 308 and to any configuration registers within DPEs 204.

Stream interfaces 310-316 (e.g., stream switch 326) are capable of providing deterministic throughput with a guaranteed and fixed latency from source to destination. In one or more embodiments, stream interfaces 310 and 314 are capable of receiving four 32-bit streams and outputting four 32-bit streams. In one or more embodiments, stream interface 314 is capable of receiving four 32-bit streams and outputting six 32-bit streams. In particular embodiments, stream interface 316 is capable of receiving four 32-bit streams and outputting four 32-bit streams. The numbers of streams and sizes of the streams of each stream interface are provided for purposes of illustration and are not intended as limitations.

Figure 4:
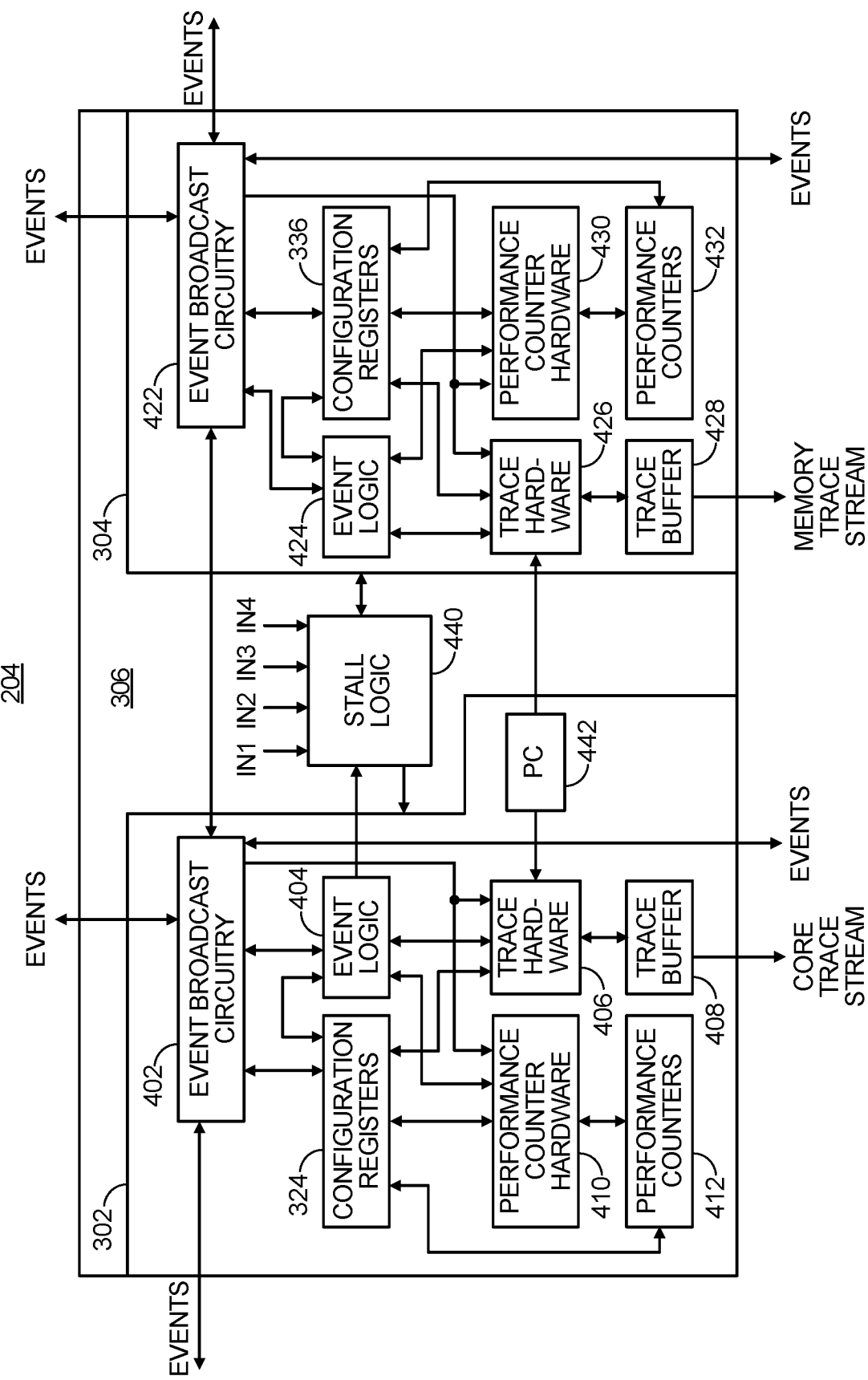
FIG. 4 illustrates an example of event processing circuitry within a DPE.

FIG. 4 illustrates an example of event processing circuitry within a DPE. DPEs may include event processing circuitry that is interconnected to event processing circuitry of other DPEs. In the example of FIG. 4, event processing circuitry is implemented within the DPE 204, such as within core 302 and within memory module 304. As illustrated, core 302 and memory module 304 include respective event broadcast circuitry 402, 422, event logic 404, 424, trace hardware 406, 426, trace buffers 408, 428, performance counter hardware 410, 430, and performance counters 412, 432. As illustrated, the core 302 further includes a program counter (PC) 442, although in some embodiments the PC 442 may be omitted, such as where the core 302 is hardwired circuitry that is dedicated for performing a particular operation or operations. The DPE 204 further includes stall logic 440.

Generally, the event logic 404 can detect events in the core 302, and the event logic 424 can detect events in the memory module 304. The conditions under which the event logic 404 detects events are defined by configuration data written to configuration registers 324, and the conditions under which the event logic 424 detects events are defined by configuration data written to configuration registers 336. The core 302 and memory module 304 can output signals that are indicative of conditions of the core 302 (e.g., floating point divide by zero, floating point invalid number, etc.) and memory module 304 (e.g., data memory out of range) that are input into the event logic 404, 424, respectively.

Further, in some examples, event logic 404 (and/or in some examples, event logic 424) can detect events generated by stream switch 326. Similar to the core 302 and memory module 304, the conditions under which the event logic 404 (and/or 424) detects events are defined by configuration data written to configuration registers. The stream switch 326 can output signals that are indicative of conditions of the stream switch 326 that are input into the event logic 404 (and/or 424).

The event logic 404, 424 is then capable of detecting events when these input signals from the core 302 and memory module 304, respectively, (and in some examples, from the stream switch 326) indicate an event to be detected according to the configuration data written to the configuration registers 324, 336, respectively. Event logic can further detect events based on any additional or other component within the respective DPE. The event logic 404, 424 is then capable of broadcasting signals relating to detected events through the respective event broadcast circuitry 402, 422, which may further cause the signals to be broadcast throughout the device 100. Further, the event logic 404, 424, alone or with other logic (e.g., trace hardware 406, 426, performance counter hardware 410, 430, stall logic 440, etc.), can trigger responses based on the detection of events, which can be used to implement debugging, tracing, and profiling, for example.

Although separate event logic 404, 424, trace hardware 406, 426, trace buffers 408, 428, performance counter hardware 410, 430, and performance counters 412, 432 are illustrated and described as being within the core 302 and memory module 304, respectively, in other examples, respective single event logic, trace hardware, trace buffer, performance counter hardware, and/or performance counter may be within a DPE. In even further examples, any combination of any number of event logic, trace hardware, trace buffers, performance counter hardware, and/or performance counters may be within a DPE and, further, within a component (e.g., within core 302 or memory module 304) of the DPE.

Event broadcast circuitry 402 may be connected to the respective event broadcast circuitry within each of the cores of the neighboring DPEs above and below the example DPE 204 illustrated in FIG. 4. Event broadcast circuitry 402 may also be connected to the respective event broadcast circuitry within the memory module of the neighboring DPE to the left of the example DPE 204 illustrated in FIG. 4. As pictured, event broadcast circuitry 402 is connected to event broadcast circuitry 422. Event broadcast circuitry 422 may be connected to the event broadcast circuitry within each of the memory modules of the neighboring DPEs above and below the example DPE 204 illustrated in FIG. 4. Event broadcast circuitry 422 may also be connected to the event broadcast circuitry within the core of the neighboring DPE to the right of the example DPE 204 illustrated in FIG. 4. The connections described here are premised on the orientation of each DPE 204 of the DPE array 102 being as illustrated in FIG. 4. However, the orientations of neighboring DPEs can be, for example, mirrored, inverted, or rotated, and hence, connections between event broadcast circuitry of the different DPEs may vary from this description. A person having ordinary skill in the art will readily understand such variations. Although the event broadcast circuitry 402, 422 are illustrated and described herein as separate circuitry, other examples can implement a single event broadcast circuitry (e.g., for both core 302 and memory module 304)

for a respective DPE or additional, separate event broadcast circuitry in a respective DPE in any configuration to broadcasts detected events.

The event processing circuitry, and more particularly, the interconnected event broadcast circuitry, of the DPEs may form an independent event broadcast network within a DPE array. The event broadcast network within the DPE array 102 may exist independently of the DPE interconnect 306. Further, the event broadcast network may be individually configurable by loading suitable configuration data into configuration registers 324 and/or 336 corresponding to the event broadcast circuitry 402 and/or 422, respectively.

Configuration registers 324 further are capable of programming event broadcast circuitry 402, while configuration registers 336 are capable of programming event broadcast circuitry 422. For example, the configuration data loaded into configuration registers 324 may determine which of the detected events received by event broadcast circuitry 402 from other event broadcast circuitry are propagated to yet other event broadcast circuitry and/or to SoC interface block 104. The configuration data may also specify which detected events generated internally by event logic 404 are propagated to other event broadcast circuitry and/or to SoC interface block 104. Additionally, the configuration data may also specify directions that event broadcast circuitry 402 propagate detected events.

Similarly, the configuration data loaded into configuration registers 336 may determine which of the events received by event broadcast circuitry 422 from other event broadcast circuitries are propagated to yet other event broadcast circuitries and/or to SoC interface block 104. The configuration data may also specify which events generated internally by event logic 424 are propagated to other event broadcast circuitries and/or to SoC interface block 104.

Accordingly, detected events generated by event logic 404 may be provided to event broadcast circuitry 402 and may be broadcast to other DPEs. In the example of FIG. 4, event broadcast circuitry 402 is capable of broadcasting events, whether internally generated or received from other DPEs, to the DPE above, to the DPE to the left, and to the DPE or tile of SoC interface block 104 below. Event broadcast circuitry 402 is also capable of broadcasting events to event broadcast circuitry 422 within memory module 304.

Detected events generated by event logic 424 may be provided to event broadcast circuitry 422 and may be broadcast to other DPEs. In the example of FIG. 4, event broadcast circuitry 422 is capable of broadcasting events, whether internally generated or received from other DPEs, to the DPE above, to the DPE to the right, and to the DPE or tile of SoC interface block 104 below. Event broadcast circuitry 422 is also capable of broadcasting events to event broadcast circuitry 402 within core 302.

In the example of FIG. 4, event broadcast circuitry located in cores 302 communicate vertically with event broadcast circuitry located in cores 302 of neighboring DPEs above and/or below. In the case where a DPE is immediately above (e.g., adjacent) SoC interface block 104, the event broadcast circuitry in the core of that DPE is capable of communicating with a tile of SoC interface block 104. Similarly, event broadcast circuitry located in memory modules 304 communicate vertically with event broadcast circuitry located in memory modules 304 of neighboring DPEs above and/or below. In the case where a DPE is immediately above (e.g., adjacent) SoC interface block 104, the event broadcast circuitry in the memory module of that DPE is capable of communicating with a tile of SoC interface block 104. Event broadcast circuitry is further capable of communicating with the event broadcast circuitry immediately to the left and/or to the right regardless of whether such event broadcast circuitry is located in another DPE and/or within a core or a memory module.

Figure 5:
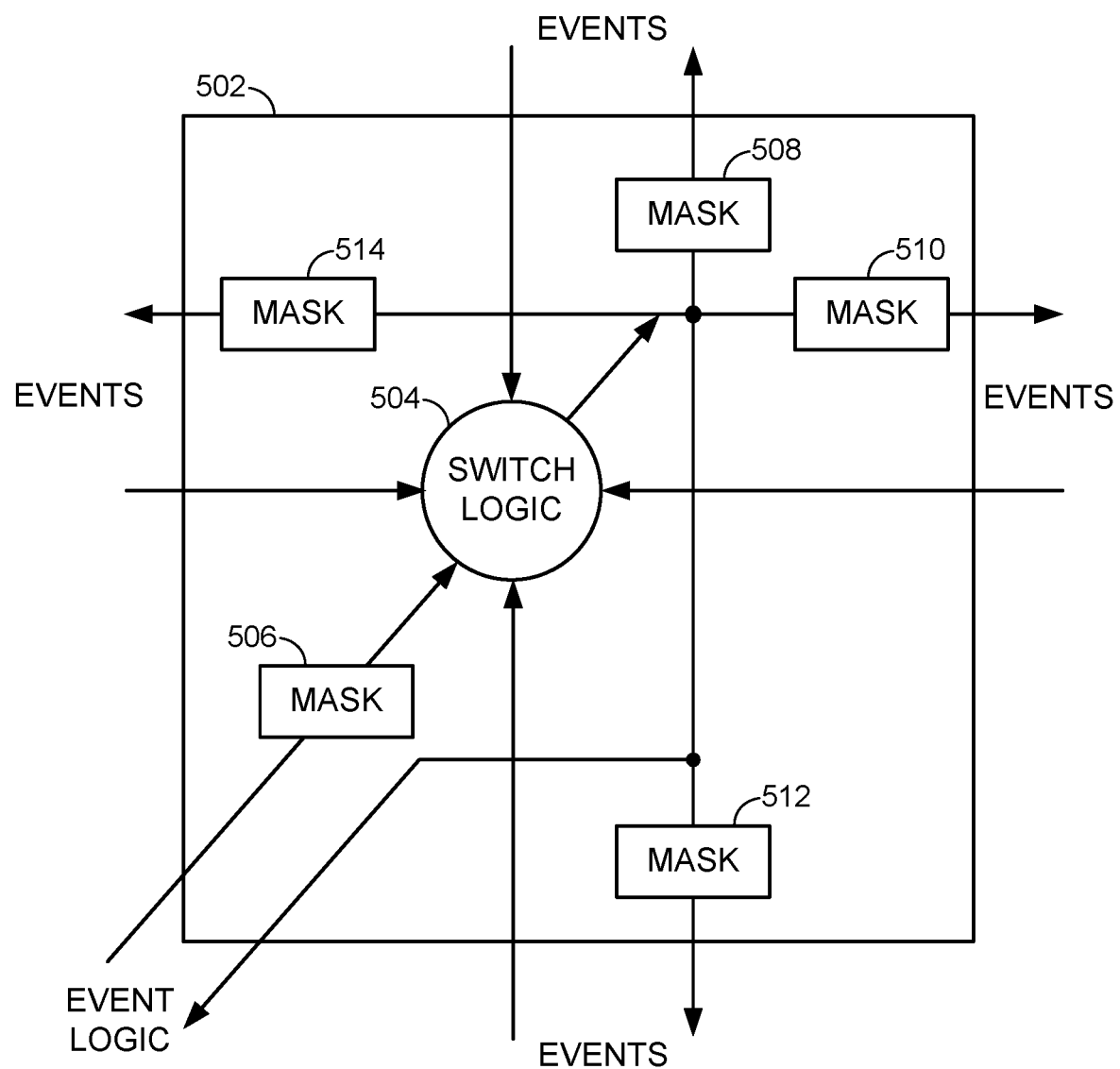
FIG. 5 illustrates a schematic of an example event broadcast circuitry.

FIG. 5 illustrates a schematic of an example event broadcast circuitry 502, which may be implemented as the event broadcast circuitry 402, 422. The event broadcast circuitry 502 includes switch logic 504 and bitmasks 506, 508, 510, 512, 514. The switch logic 504 and bitmasks 506, 508, 510, 512, 514, together or individually, can implement logic to determine which signals are propagated and in what directions.

Generally, the signals received at the switch logic 504, e.g., from neighboring event broadcast circuitry and from Event Logic, are ORed together to generate a signal at the output of the switch logic 504. The signal received from Event Logic can be selectively input into the switch logic 504 by bitmasking detected events generated by the event logic with the bitmask 506. In some examples, a subset of events that may be detected by Event Logic are connected and/or transmitted to the event broadcast circuitry 502. From the output of the switch logic 504, the bitmasks 508, 510, 512, 514, alone or with the switch logic 504, can bitmask the signal output from the switch logic 504 to selectively broadcast the signal to a neighboring event broadcast circuitry, which may be in the same DPE and/or a neighboring DPE or tile of SoC interface block 104. Inputs to and/or outputs of the event broadcast circuitry 502 (e.g., inputs/outputs of switch logic 504 and bitmasks 506, 508, 510, 512, 514) can be multiple bit signals.

The switch logic 504 and bitmasks 508, 510, 512, 514 can be configured to implement rules, which may avoid looping of event broadcasts. Generally, an output signal along a vertical direction can be an ORed result of event input signals from masked Event Logic and all directions, except an input signal received from the respective direction that the output signal will be output. Generally, an output signal along a horizontal direction can be an ORed result of event input signals from masked Event Logic and the other horizontal direction. Generally, an output signal to the Event Logic internal to the respective core 302 or memory module 304 may be the ORed result of event input signals from all directions. Other rules may be implemented to propagate or not propagate signals in various directions.

The bitmasks 506, 508, 510, 512, 514 can be configured by writing to corresponding configuration registers 324, 336. Hence, configurations written to configuration registers 324, 336 can determine which signals can be propagated and in what directions.

Referring back to the example of FIG. 4, the event logic 404, 424 can detect events based on a configuration. Event broadcast circuitry 402 and event logic 404 may be configured by configuration registers 324. Event broadcast circuitry 422 and event logic 424 may be configured by configuration registers 336. Configuration registers 324 and 336 may be written via memory mapped switches (e.g., memory mapped switch 332) of DPE interconnect 306. In the example of FIG. 4, configuration registers 324 program event logic 404 to detect particular types of events that occur within core 302. The configuration data loaded into configuration registers 324, for example, determines conditions under which any of a plurality of different types of predetermined events is detected by event logic 404. Examples of events may include, but are not limited to, starts and/or ends of read operations by core 302, starts and/or ends of write operations by core 302, stalls, and the occurrence of other operations performed by core 302. Similarly, configuration registers 336 program event logic 424 to detect particular types of events that occur within memory module 304. Examples of events may include, but are not limited to, starts and/or ends of read and/or write operations by a direct memory access (DMA) engine in the memory module 304, stalls, and the occurrence of other operations performed by memory module 304. The configuration data loaded into configuration registers 336, for example, determines conditions under which any of a plurality of different types of predetermined events is detected by event logic 424. It should be appreciated that event logic 404 and/or event logic 424 are capable of detecting events originating from and/or relating to a DMA engine in the memory module 304, memory mapped switch 332, stream switch 326, memory interfaces of memory module 304, core interfaces of core 302, cascade interfaces of core 302, and/or other components located in DPEs.

Further, in some examples, events can be detected based on a combination of other detected events (e.g., combo events). For example, an event that can be detected can be based on some logical combination of identified detected events. As an example, configuration registers 324 are configured to define conditions under which a first event having a first event identification EID1 and a second event having a second event identification EID2 are to be detected by the event logic 404. Another configuration register 324 is configured to define a logical combination (e.g., OR or AND) of the first event and the second event, such as by writing control bits indicating the logical combination and by writing the EID1 and EID2 to the configuration register 324. Hence, the configuration register 324 can be used to implement detection of the combo event.

Once configuration registers 324 and 336 are written, each event logic 404, 424 is capable of operating in the background to detect the occurrence of the events. In particular embodiments, event logic 404 generates detected events in response to detecting particular conditions within core 302; and event logic 424 generates detected events in response to detecting particular conditions within memory module 304.

In some examples, the detection of an event, whether by the event logic 404, 424 within the DPE 204 or by receipt of the detected event from another DPE, can cause a response by the event logic 404, 424 and/or other logic. Examples of logic can include the trace hardware 406, 426, performance counter hardware 410, 430, and stall logic 440. Various configuration registers 324, 336, associated with and/or in conjunction with the event logic 404, 424 and/or other logic, can be defined in the architecture with a response when an identified event written to the respective configuration register 324, 336 is detected. For example, a first register REG1 of the configuration registers 324 can be defined in the architecture as corresponding with a first response RESP1, and that first register REG1 can be written with a first event identification EID1. Hence, in that example, when an event corresponding to EID1 that is written in REG1 is detected, RESP1 can be caused to occur. Example responses include event broadcast (as described above), debug, trace, profile, other control, or other actions. Example responses are described further below in the context of troubleshooting the device 100.

Further details of debugging, tracing, and profiling are described below. In some examples, data from various components can be read and/or written during debugging. For example, various configuration registers 324, 336 or others can be read or written during debugging via memory mapped transactions through the memory mapped switch 332 of the respective DPE. Similarly, performance counters 412, 432 can be read or written during profiling via memory mapped transactions through the memory mapped switch 332 of the respective DPE. Trace data may be transmitted from trace buffers 408, 418 through stream switch 326 of the respective DPE (e.g., via stream interfaces 338, 328 and/or 340, 330).

Figure 6:
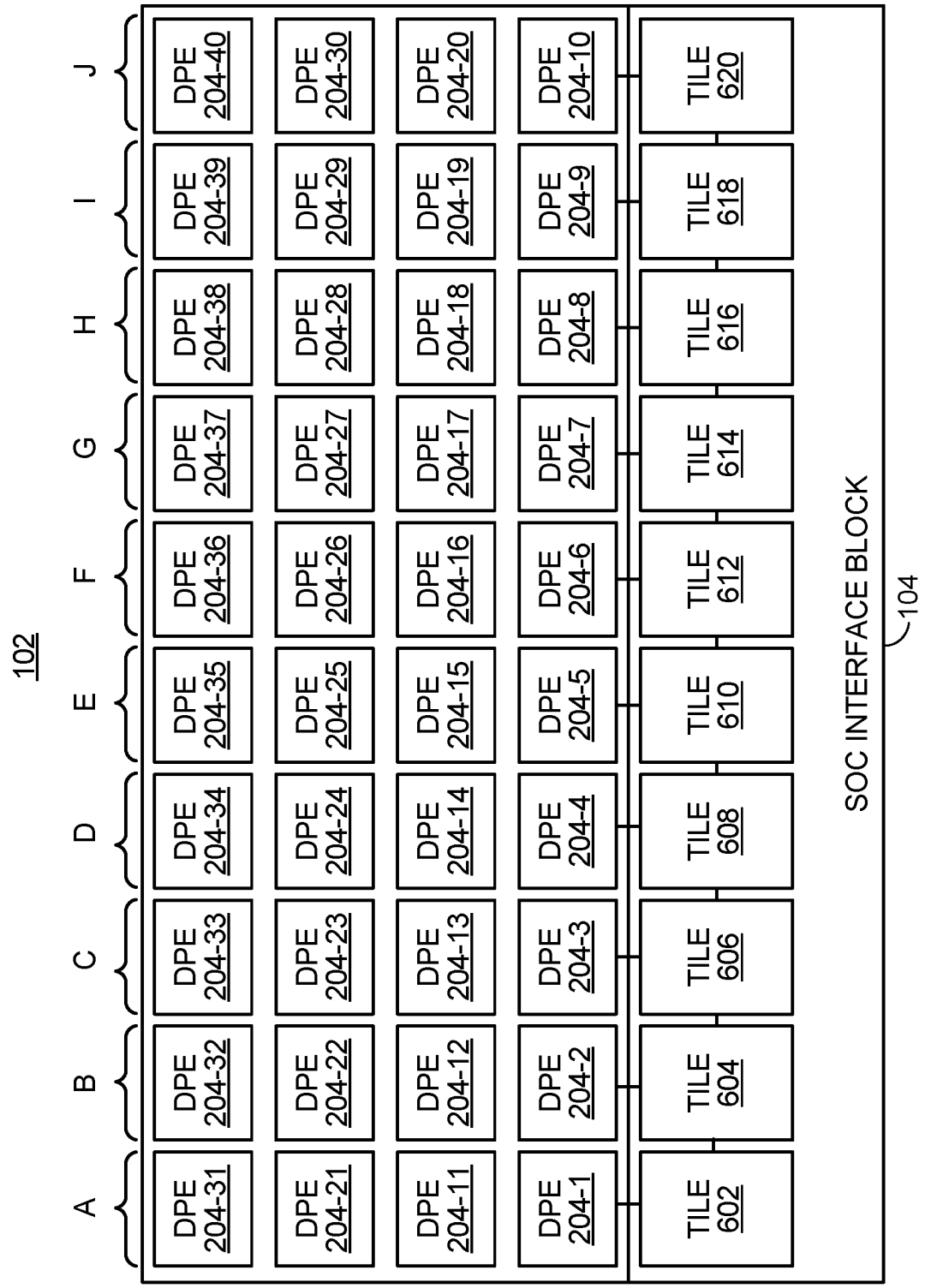
FIG. 6 illustrates an example architecture for a DPE array.

FIG. 6 illustrates an example architecture for DPE array 102 of FIG. 1. In the example of FIG. 6, SoC interface block 104 provides an interface between DPEs 204 and other subsystems of device 100. SoC interface block 104 integrates DPEs into the device. SoC interface block 104 is capable of conveying configuration data to DPEs 204, conveying detected events from DPEs 204 to other subsystems, conveying events from other subsystems to DPEs 204, generating and conveying interrupts to entities external to DPE array 102, conveying application data between other subsystems and DPEs 204, and/or conveying trace and/or debug data between other subsystems and DPEs 204.

In the example of FIG. 6, SoC interface block 104 includes a plurality of interconnected tiles. For example, SoC interface block 104 includes tiles 602, 604, 606, 608, 610, 612, 614, 616, 618, and 620. In the example of FIG. 6, tiles 602-620 are organized in a row. In other embodiments, tiles may be arranged in a column, in a grid, or in another layout. For example, SoC interface block 104 may be implemented as a column of tiles on the left of DPEs 204, on the right of DPEs 204, between columns of DPEs 204, or the like. In another embodiment, SoC interface block 104 may be located above DPE array 102. SoC interface block 104 may be implemented so that tiles are located in any combination of below DPE array 102, to the left of DPE array 102, to the right of DPE array 102, and/or above DPE array 102. In this regard, FIG. 6 is provided for purposes of illustration and not limitation.

In one or more embodiments, tiles 602-620 have a same architecture. In one or more other embodiments, tiles 602-620 may be implemented with two or more different architectures. In particular embodiments, different architectures may be used to implement tiles within SoC interface block 104 where each different tile architecture supports communication with a different type of subsystem or combination of subsystems of device 100. Each DPE 204 and tile of SoC interface block 104 may generically be referred to as an array component, which, e.g., forms a cell within an array, such as the DPE array 102.

In the example of FIG. 6, tiles 602-620 are coupled so that data may be propagated from one tile to another. For example, data may be propagated from tile 602 through tiles 604, 606, and on down the line of tiles to tile 620. Similarly, data may be propagated in the reverse direction from tile 620 to tile 602. In one or more embodiments, each of tiles 602-620 is capable of operating as an interface for a plurality of DPEs. For example, each of tiles 602-620 is capable of operating as an interface for a subset of the DPEs 204 of DPE array 102. The subset of DPEs to which each tile provides an interface may be mutually exclusive such that no DPE is provided with an interface by more than one tile of SoC interface block 104.

In one example, each of tiles 602-620 provides an interface for a column of DPEs 204. For purposes of illustration, tile 602 provides an interface to the DPEs of column A. Tile 604 provides an interface to the DPEs of column B, etc. In each case, the tile includes a direct connection to an adjacent DPE in the column of DPEs, which is the bottom DPE in this example. Referring to column A, for example, tile 602 is directly connected to DPE 204-1. Other DPEs within column A may communicate with tile 602 but do so through the DPE interconnects of the intervening DPEs in the same column.

For example, tile 602 is capable of receiving data from another source such as PS 212, PL 210, and/or another hardwired circuit block, e.g., an ASIC block. Tile 602 is capable of providing those portions of the data addressed to DPEs in column A to such DPEs while sending data addressed to DPEs in other columns (e.g., DPEs for which tile 602 is not an interface) on to tile 604. Tile 604 may perform the same or similar processing where data received from tile 602 that is addressed to DPEs in column B is provided to such DPEs, while sending data addressed to DPEs in other columns on to tile 606, and so on.

In this manner, data may propagate from tile to tile of SoC interface block 104 until reaching the tile that operates as an interface for the DPEs to which the data is addressed (e.g., the "target DPE(s)"). The tile that operates as an interface for the target DPE(s) is capable of directing the data to the target DPE(s) using the memory mapped switches of the DPEs and/or the stream switches of the DPEs.

As noted, the use of columns is an example implementation. In other embodiments, each tile of SoC interface block 104 is capable of providing an interface to a row of DPEs of DPE array 102. Such a configuration may be used in cases where SoC interface block 104 is implemented as a column of tiles, whether on the left, right, or between columns of DPEs 204. In other embodiments, the subset of DPEs to which each tile provides an interface may be any combination of fewer than all DPEs of DPE array 102. For example, DPEs 204 may be apportioned to tiles of SoC interface block 104. The particular physical layout of such DPEs may vary based upon connectivity of the DPEs as established by DPE interconnects. For example, tile 602 may provide an interface to DPEs 204-1, 204-2, 204-11, and 204-12. Another tile of SoC interface block 104 may provide an interface to four other DPEs, and so forth.

Figure 7A:
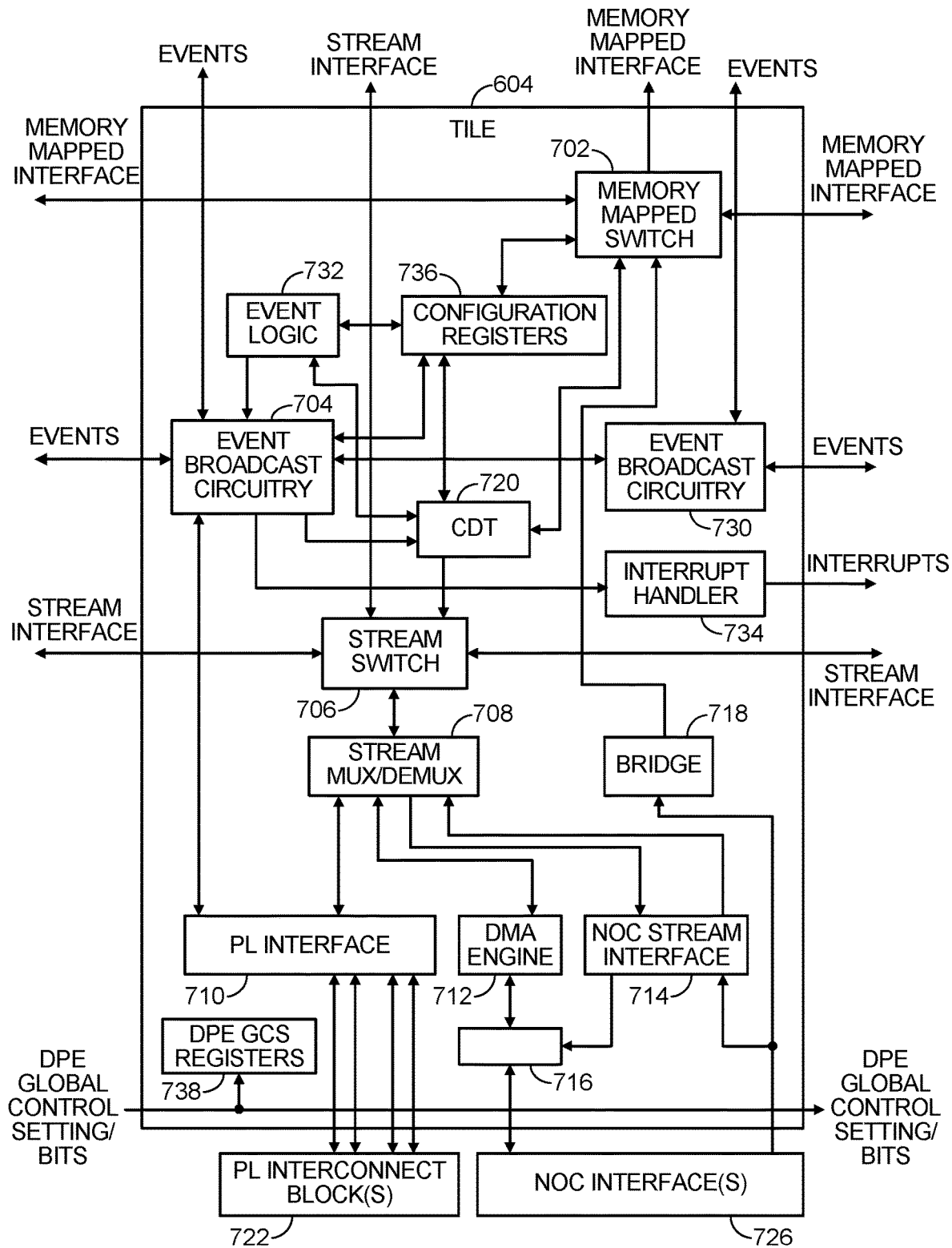
FIGS. 7A, 7B, and 7C illustrate example architectures for implementing tiles of a System-on-Chip (SoC) interface block.
Figure 7B:
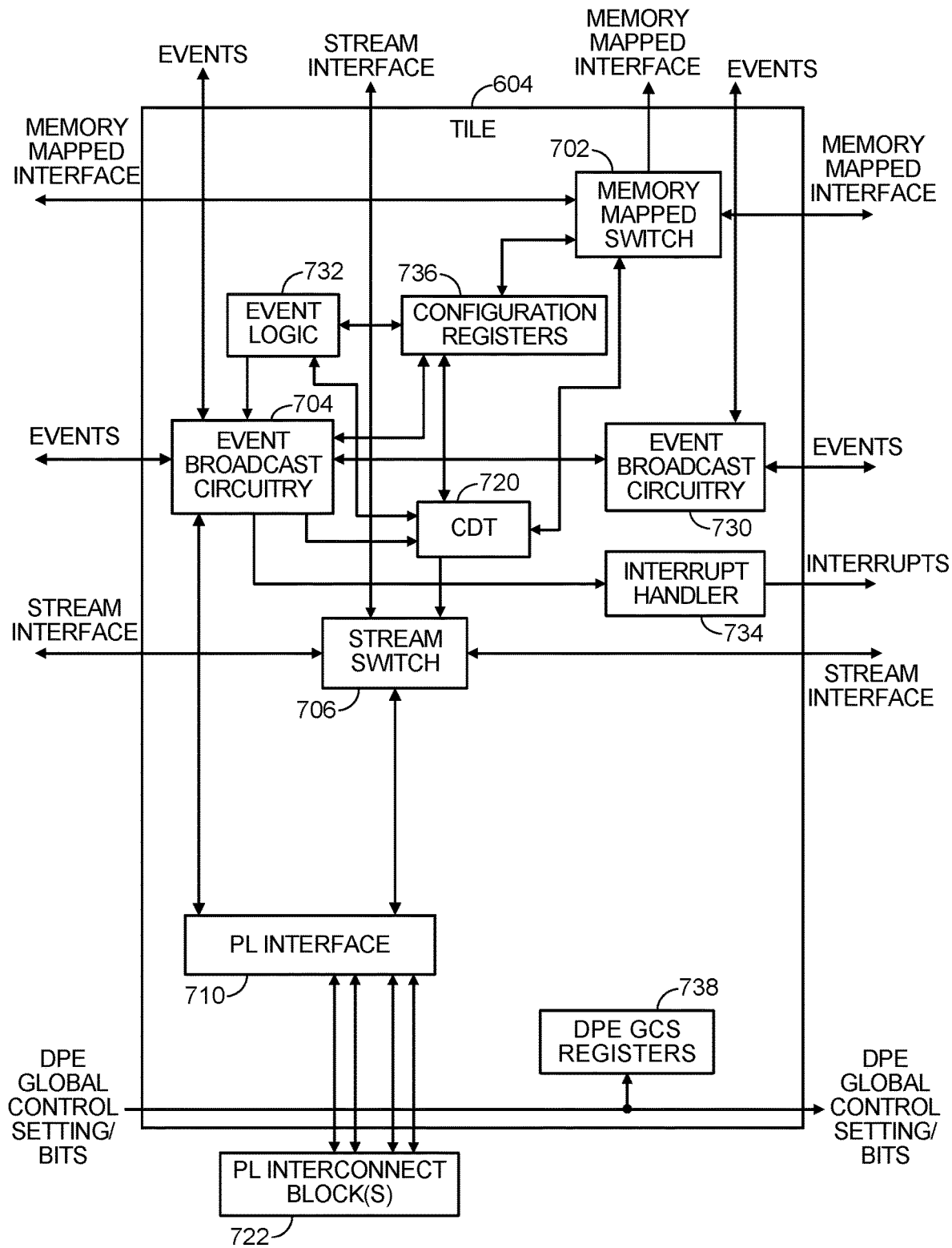
Figure 7C:
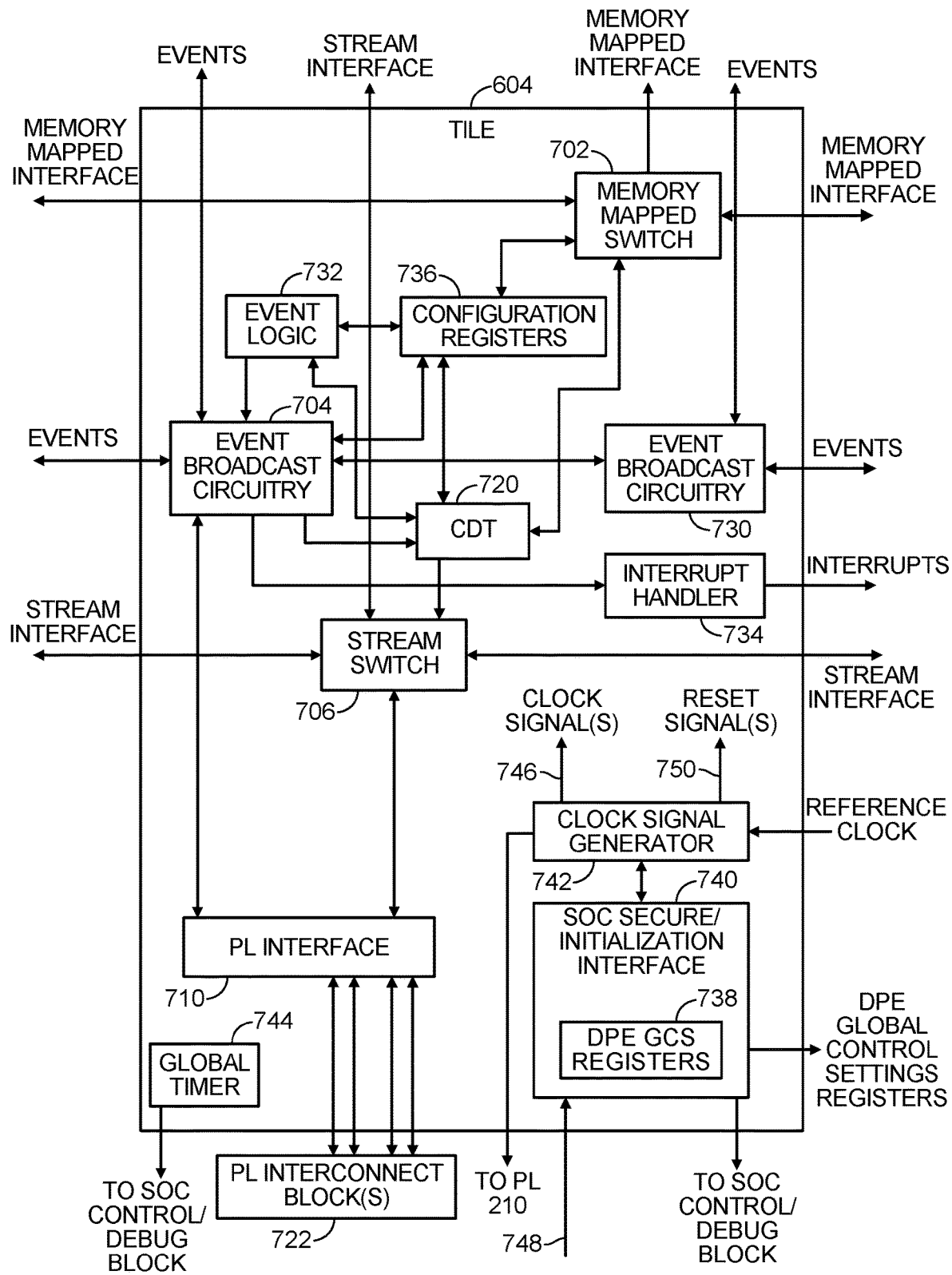

FIGS. 7A, 7B, and 7C illustrate example architectures for implementing tiles of SoC interface block 104. FIG. 7A illustrates an example implementation of tile 604. The architecture illustrated in FIG. 7A may also be used to implement any of the other tiles included in SoC interface block 104.

Tile 604 includes a memory mapped switch 702. Memory mapped switch 702 may include a plurality of memory mapped interfaces for communicating in each of a plurality of different directions. As an illustrative and non-limiting example, memory mapped switch 702 may include one or more memory mapped interfaces where a memory mapped interface has a master that connects vertically to the memory mapped interface of the DPE immediately above. As such, memory mapped switch 702 is capable of operating as a master to the memory mapped interfaces of one or more of the DPEs. In a particular example, memory mapped switch 702 may operate as a master for a subset of DPEs. For example, memory mapped switch 702 may operate as a master for the column of DPEs above tile 604, e.g., column B of FIG. 6. It should be appreciated that memory mapped switch 702 may include additional memory mapped interfaces to connect to a plurality of different circuits (e.g., DPEs) within DPE array 102. The memory mapped interfaces of memory mapped switch 702 may also include one or more slaves capable of communicating with circuitry (e.g., one or more DPE(s)) located above tile 604.

In the example of FIG. 7A, memory mapped switch 702 may include one or more memory mapped interfaces that facilitate communication in the horizontal direction to memory mapped switches in neighboring tiles (e.g., tiles 602 and 606). For purposes of illustration, memory mapped switch 702 may be connected to neighboring tiles in the horizontal direction via memory mapped interfaces, where each such memory mapped interface includes one or more masters and/or one or more slaves. Accordingly, memory mapped switch 702 is capable of moving data (e.g., configuration, control, and/or debug data) from one tile to another to reach a correct DPE and/or subset of a plurality of DPEs and direct the data to the target DPEs, whether such DPEs are in the column above tile 604 or in another subset for which another tile of SoC interface block 104 operates as an interface. If memory mapped transactions are received from NoC 208, for example, memory mapped switch 702 is capable of distributing the transaction(s) horizontally, e.g., to other tiles within SoC interface block 104.

Memory mapped switch 702 may also include a memory mapped interface having one or more masters and/or slaves coupled to configuration registers 736 within tile 604. Through memory mapped switch 702, configuration data may be loaded into configuration registers 736 to control various functions and operations performed by components within tile 604.

Memory mapped switch 702 may include a memory mapped interface coupled to NoC interface(s) 726 via bridge 718. The memory mapped interface may include one or more masters and/or slaves. Bridge 718 is capable of converting memory mapped data transfers from NoC 208 (e.g., configuration, control, and/or debug data) into memory mapped data that may be received by memory mapped switch 702.

Tile 604 may also include event processing circuitry. For example, tile 604 includes event logic 732, event broadcast circuitry 704, and event broadcast circuitry 730, which may operate and be configured similarly as event logic 404, 424 and event broadcast circuitry 402, 422 described previously with respect to FIGS. 4 and 5. Event logic 732 may be configured by configuration registers 736. The configuration data loaded into configuration registers 736 defines the particular events that may be detected locally within tile 604. Event logic 732 is capable of detecting a variety of different events, per configuration registers 736, originating from and/or relating to, DMA engine 712, memory mapped switch 702, stream switch 706, first-in-first-out (FIFO) memories located within PL interface 710, and/or NoC stream interface 714. Examples of events may include, but are not limited to, DMA finished transfer, lock being released, lock being acquired, end of PL transfer, or other suitable events.

Each of event broadcast circuitry 704 and event broadcast circuitry 730 provide an interface between the event broadcast network of DPE array 102, other tiles of SoC interface block 104, and PL 210 of device 100. Event broadcast circuitry 704 is coupled to event broadcast circuitry in adjacent or neighboring tile 602 and to event broadcast circuitry 730. Event broadcast circuitry 730 is coupled to event broadcast circuitry in adjacent or neighboring tile 606. In one or more other embodiments, where tiles of SoC interface block 104 are arranged in a grid or array, event broadcast circuitry 704 and/or event broadcast circuitry 730 may be connected to event broadcast circuitry located in other tiles above and/or below tile 604.

In the example of FIG. 7A, event broadcast circuitry 704 is coupled to the event broadcast circuitry in the core of the DPE immediately adjacent to tile 604, e.g., DPE 204-2 immediately above tile 604 in column B. Event broadcast circuitry 704 is also coupled to PL interface 710. In some examples, event broadcast circuitry 730 is additionally or alternatively coupled to the PL interface 710. Event broadcast circuitry 730 is coupled to the event broadcast circuitry in the memory module of the DPE immediately adjacent tile 604, e.g., DPE 204-2 immediately above tile 604 in column B. The couplings described here are premised on the orientation of the respective DPE, e.g., DPE 204-2, having the orientation as illustrated in FIG. 4. However, as described previously, the orientations of DPEs can be, for example, mirrored, inverted, or rotated, and hence, connections between event broadcast circuitry of the DPEs and tiles of SoC interface block may vary from this description. A person having ordinary skill in the art will readily understand such variations.

Event broadcast circuitry 704 and event broadcast circuitry 730 are capable of sending detected events generated internally by event logic 732, and capable of receiving and sending detected events received from other tiles of SoC interface block 104 and/or detected events received from DPEs in column B (or other DPEs of DPE array 102) on to other tiles. Event broadcast circuitry 704 is further capable of sending such detected events to PL 210 via PL interface 710. In another example, events may be sent from event broadcast circuitry 704 to other blocks and/or subsystems in device 100 such as an ASIC and/or PL circuit blocks located outside of DPE array 102 using PL interface 710. Further, event broadcast circuitry 704 is capable of sending any detected events received from PL 210 via PL interface 710 to other tiles of SoC interface block 104 and/or to DPEs in column B and/or other DPEs of DPE array 102. In another example, events received from PL 210 may be sent from event broadcast circuitry 704 to other blocks and/or subsystems in device 100 such as an ASIC. Because detected events may be broadcast among the tiles in SoC interface block 104, detected events may reach any DPE in DPE array 102 by traversing through tiles in SoC interface block 104 and the event broadcast circuitry to the target (e.g., intended) DPEs. For example, the event broadcast circuitry in the tile of SoC interface block 104 beneath the column (or subset) of DPEs managed by the tile including a target DPE may propagate the detected events to the target DPEs.

In one or more embodiments, event broadcast circuitry 704 and event broadcast circuitry 730 are capable of gathering broadcast detected events from one or more or all directions as illustrated in FIG. 7A. In particular embodiments, event broadcast circuitry 704 and/or event broadcast circuitry 730 may each implement the example event broadcast circuitry 502 illustrated in and described with respect to FIG. 5.

Interrupt handler 734 is coupled to event broadcast circuitry 704 and is capable of receiving events that are broadcast from event broadcast circuitry 704. In one or more embodiments, interrupt handler 734 may be configured by configuration data loaded into configuration registers 736 to generate interrupts in response to selected detected events and/or combinations of detected events from event broadcast circuitry 704. Interrupt handler 734 is capable of generating interrupts, based upon the configuration data, to PS 212 and/or to other device-level management blocks within device 100. As such, interrupt handler 734 is capable of informing PS 212 and/or such other device-level management blocks of events occurring in DPE array 102, of events occurring in tiles of SoC interface block 104, and/or of events occurring in PL 210 based upon the interrupt(s) that are generated by interrupt handler 734.

In particular embodiments, interrupt handler 734 may be coupled to an interrupt handler or an interrupt port of PS 212 and/or of other device-level management blocks by a direct connection. In one or more other embodiments, interrupt handler 734 may be coupled to PS 212 and/or other device-level management blocks by another interface.

PL interface 710 couples to PL 210 of device 100 and provides an interface thereto. In one or more embodiments, PL interface 710 provides an asynchronous clock-domain crossing between the DPE array clock(s) and the PL clock. PL interface 710 may also provide level shifters and/or isolation cells for integration with PL power rails. In particular embodiments, PL interface 710 may be configured to provide 32-bit, 64-bit, and/or a 128-bit interface with FIFO support to handle back-pressure. The particular width of PL interface 710 may be controlled by configuration data loaded into configuration registers 736. In the example of FIG. 7A, PL interface 710 couples directly to one or more PL interconnect blocks 722. In particular embodiments, PL interconnect blocks 722 are implemented as hardwired circuit blocks that couple to interconnect circuitry located in PL 210.

In one or more other embodiments, PL interface 710 is coupled to other types of circuit blocks and/or subsystems. For example, PL interface 710 may be coupled to an ASIC, analog/mixed signal circuitry, and/or other subsystem. As such, PL interface 710 is capable of transferring data between tile 604 and such other subsystems and/or blocks.

In the example of FIG. 7A, tile 604 includes a stream switch 706. Stream switch 706 is coupled to a stream switch in adjacent or neighboring tile 602 and to a stream switch in adjacent or neighboring tile 606 through one or more stream interfaces. Each stream interface may include one or more masters and/or one or more slaves. In particular embodiments, each pair of neighboring stream switches is capable of exchanging data via one or more streams in each direction. Stream switch 706 is also coupled to the stream switch in the DPE immediately above tile 604 in column B, e.g., DPE 204-2, by one or more stream interfaces. As discussed, a stream interface may include one or more stream slaves and/or stream masters. Stream switch 706 is also coupled to PL interface 710, DMA engine 712, and/or to NoC stream interface 714 via stream multiplexer/demultiplexer 708 (abbreviated as stream mux/demux in FIG. 7A). Stream switch 706, for example, may include one or more stream interfaces used to communicate with each of PL interface 710, DMA engine 712, and/or NoC stream interface 714 through stream multiplexer/demultiplexer 708.

In one or more other embodiments, stream switch 706 may be coupled to other circuit blocks in other directions and/or in diagonal directions depending upon the number of stream interfaces included and/or the arrangement of tiles and/or DPEs and/or other circuit blocks around tile 604.

In one or more embodiments, stream switch 706 is configurable by configuration data loaded into configuration registers 736. Stream switch 706, for example, may be configured to support packet-switched and/or circuit-switched operation based upon the configuration data. Further, the configuration data defines the particular DPE and/or DPEs within DPE array 102 to which stream switch 706 communicates. In one or more embodiments, the configuration data defines the particular DPE and/or subset of DPEs (e.g., DPEs within column B) of DPE array 102 to which stream switch 706 communicates.

Stream multiplexer/demultiplexer 708 is capable of directing data received from PL interface 710, DMA engine 712, and/or NoC stream interface 714 to stream switch 706.

Similarly, stream multiplexer/demultiplexer 708 is capable of directing data received from stream switch 706 to PL interface 710, DMA engine 712, and/or to NoC stream interface 714. For example, stream multiplexer/demultiplexer 708 may be programmed by configuration data stored in configuration registers 736 to route selected data to PL interface 710, to route selected data to DMA engine 712 where such data are sent over NoC 208 as memory mapped transactions, and/or to route selected data to NoC stream interface 714 where the data are sent over NoC 208 as a data stream or streams.

DMA engine 712 is capable of operating as a master to direct data into NoC 208 through selector block 716 and on to NoC interface(s) 726. DMA engine 712 is capable of receiving data from DPEs and providing such data to NoC 208 as memory mapped data transactions. In one or more embodiments, DMA engine 712 includes hardware synchronization circuitry that may be used to synchronize multiple channels included in DMA engine 712 and/or a channel within DMA engine 712 with a master that polls and drives the lock requests. For example, the master may be PS 212 or a device implemented within PL 210. The master may also receive an interrupt generated by the hardware synchronization circuitry within DMA engine 712.

In one or more embodiments, DMA engine 712 is capable of accessing an external memory. For example, DMA engine 712 is capable of receiving data streams from DPEs and sending the data stream to external memory through NoC 208 to a memory controller located within the SoC. The memory controller then directs the data received as data streams to the external memory (e.g., initiates reads and/or writes of the external memory as requested by DMA engine 712). Similarly, DMA engine 712 is capable of receiving data from external memory where the data may be distributed to other tile(s) of SoC interface block 104 and/or up into target DPEs.

In particular embodiments, DMA engine 712 includes security bits that may be set using DPE global control settings registers (DPE GCS registers) 738. The External memory may be divided into different regions or partitions where DPE array 102 is only permitted to access particular regions of the external memory. The security bits within DMA engine 712 may be set so that DPE array 102, by way of DMA engine 712, is only able to access the particular region(s) of external memory that are allowed per the security bits. For example, an application implemented by DPE array 102 may be restricted to access only particular regions of external memory, restricted to only reading from particular regions of external memory, and/or restricted from writing to the external memory entirely using this mechanism.

The security bits within DMA engine 712 that control access to the external memory may be implemented to control DPE array 102 as a whole or may be implemented in a more granular way where access to external memory may be specified and/or controlled on a per DPE basis, e.g., core by core, or for groups of cores that are configured to operate in a coordinated manner, e.g., to implement a kernel and/or other application.

NoC stream interface 714 is capable of receiving data from NoC 208 via NoC interface(s) 726 and forwarding the data to stream to multiplexer/demultiplexer 708. NoC stream interface 714 is further capable of receiving data from stream multiplexer/demultiplexer 708 and forwarding the data to NoC interface 726 through selector block 716.

Selector block 716 is configurable to pass data from DMA engine 712 or from NoC stream interface 714 on to NoC interface(s) 726.

Figure 8:
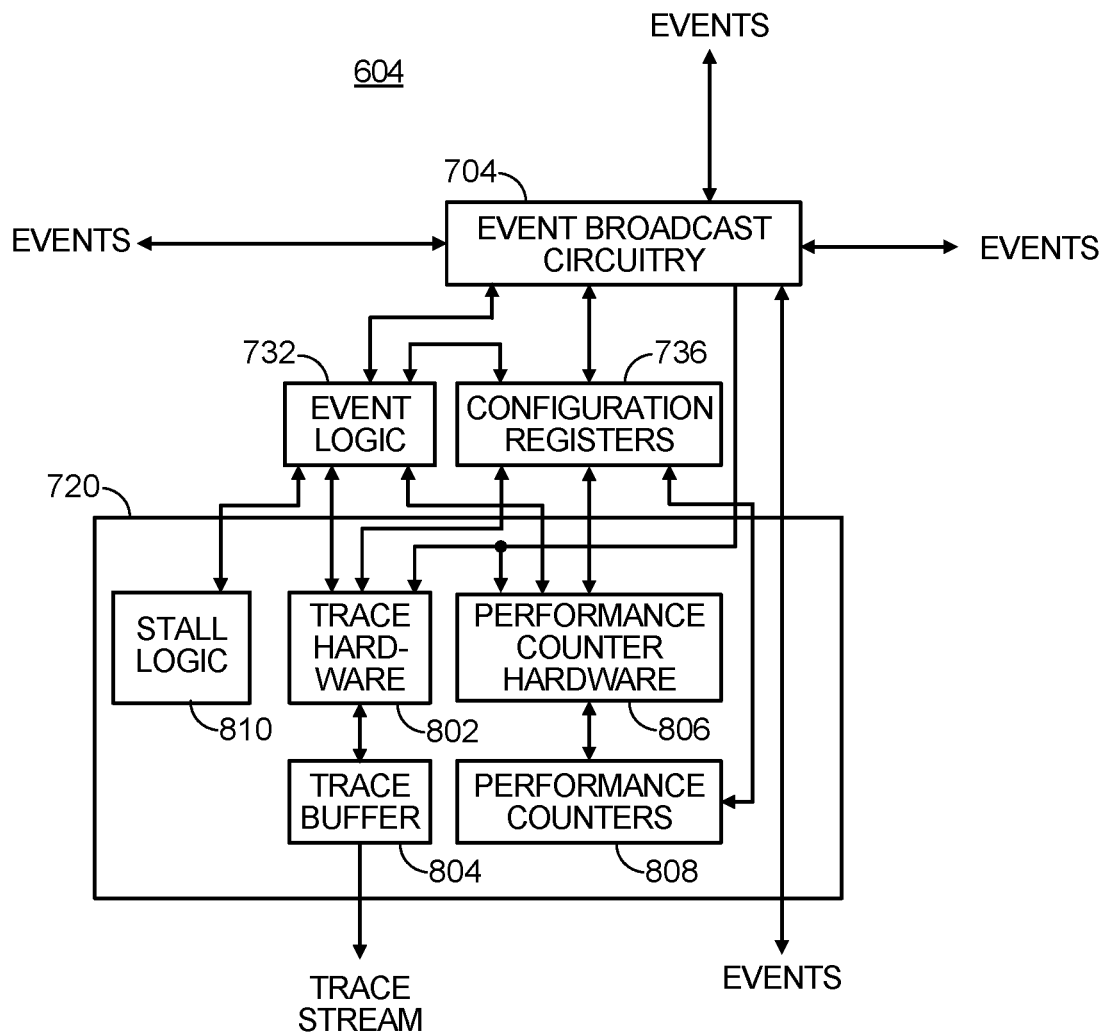
FIG. 8 illustrates an example of event processing circuitry within a tile of a SoC interface block.

Control, debug, and trace (CDT) circuit 720 includes logic that is capable of performing control, debug, and trace operations within tile 604. The CDT circuit 720 can include logic similar to the trace hardware 406, 426, trace buffers 408, 428, performance counter hardware 410, 430, performance counters 412, 432, and stall logic 440 in FIG. 4. For example, as illustrated in FIG. 8, the CDT circuit 720 includes trace hardware 802, a trace buffer 804, performance counter hardware 806, performance counters 808, and, optionally, stall logic 810. Stall logic 810 may be omitted from the CDT circuit 720 in other examples. The operation of such logic is described in more detail below. Regarding debug generally, each of the registers located in tile 604 is mapped onto the memory map accessible via memory mapped switch 702. The trace hardware 802 of the CDT circuit 720 is also capable of collecting trace data, buffering the trace data in the trace buffer 804, and outputting the trace data to stream switch 706. In some examples, the trace data can include detected events, performance counters, PC values, and/or other data. In one or more embodiments, CDT circuit 720 is capable of collecting data, e.g., trace and/or debug data, packetizing such data, and then outputting the packetized data through stream switch 706. For example, CDT circuit 720 is capable of outputting packetized data and providing such data to stream switch 706. Additionally, configuration registers 736 or others can be read or written during debugging via memory mapped transactions through the memory mapped switch 702 of the respective tile. Similarly, performance counters 808 can be read or written during profiling via memory mapped transactions through the memory mapped switch 702 of the respective tile.

In one or more embodiments, CDT circuit 720 is capable of receiving any events propagated by event broadcast circuitry 704 or selected events per the bitmask utilized by the interface of event broadcast circuitry 704 that is coupled to CDT circuit 720. For example, CDT circuit 720 is capable of receiving broadcast events, whether from PL 210, DPEs 204, tile 604, and/or or other tiles of SoC interface block 104. CDT circuit 720, such as by trace hardware 802 and trace buffer 804, is capable of packing, e.g., packetizing, a plurality of such events together in a packet and associating the packetized events with timestamp(s). CDT circuit 720 is further capable of sending the packetized events over stream switch 706 to destinations external to tile 604.

DPE GCS registers 738 may store DPE global control settings/bits (also referred to herein as "security bits") that are used to enable or disable secure access to and/or from DPE array 102. DPE GCS registers 738 may be programmed via a SoC secure/initialization interface to be described in greater detail below in connection with FIG. 7C. The security bit(s) received from the SoC secure/initialization interface may propagate from one tile to the next of SoC interface block 104 via a bus as illustrated in FIG. 7A.

In one or more embodiments, external memory mapped data transfers into DPE array 102 (e.g., using NoC 208) are not secure or trusted. Without setting the security bits within DPE GCS registers 738, any entity in device 100 that is capable of communicating by way of memory mapped data transfers (e.g., over NoC 208) is capable of communicating with DPE array 102. By setting the security bits within DPE GCS registers 738, the particular entities that are permitted to communicate with DPE array 102 may be defined such that only the specified entities capable of generating secure traffic may communicate with DPE array 102.

For example, the memory mapped interfaces of memory mapped switch 702 are capable of communicating with NoC 208. Memory mapped data transfers may include additional sideband signals, e.g., bits, that specify whether a transaction is secure or not secure. When the security bits within DPE GCS registers 738 are set, then memory mapped transactions entering into SoC interface block 104 must have the sideband signals set to indicate that the memory mapped transaction arriving at SoC interface block 104 from NoC 208 is secure. When a memory mapped transaction arriving at SoC interface block 104 does not have the sideband bits set and the security bits are set within DPE GCS registers 738, then SoC interface block 104 does not allow the transaction to enter or pass to DPEs 204.

In one or more embodiments, the SoC includes a secure agent (e.g., circuit) that operates as a root of trust. The secure agent is capable of configuring the different entities (e.g., circuits) within the SoC with the permissions needed to set the sideband bits within memory mapped transactions in order to access DPE array 102 when the security bits of DPE GCS registers 738 are set. The secure agent, at the time the SoC is configured, gives permissions to the different masters that may be implemented in PL 210 or PS 212 thereby giving such masters the capability of issuing secure transactions over NoC 208 (or not) to DPE array 102.

FIG. 7B illustrates another example implementation of tile 604. The example architecture illustrated in FIG. 7B may also be used to implement any of the other tiles included in SoC interface block 104. The example of FIG. 7B illustrates a simplified version of the architecture illustrated in FIG. 7A. The tile architecture of FIG. 7B provides connectivity among DPEs and other subsystems and/or blocks within device 100. For example, tile 604 of FIG. 7B may provide an interface between DPEs and PL 210, analog/mixed signal circuit blocks, ASICs, or other subsystems as described herein. The tile architecture of FIG. 7B does not provide connectivity to NoC 208. As such, DMA engine 712, NoC stream interface 714, selector block 716, bridge 718, and stream multiplexer/demultiplexer 708 are omitted. Further, as pictured, stream switch 706 is directly coupled to PL interface 710.

The example architecture of FIG. 7B is unable to receive memory mapped data, e.g., configuration data, for purposes of configuring DPEs from NoC 208. Such configuration data may be received from neighboring tiles via memory mapped switch 702 and directed to the subset of DPEs that tile 604 manages (e.g., up into the column of DPEs above tile 604 of FIG. 7B).

FIG. 7C illustrates another example implementation of tile 604. In particular embodiments, the architecture illustrated in FIG. 7C may be used to implement only one tile within SoC interface block 104. For example, the architecture illustrated in FIG. 7C may be used to implement tile 602 within SoC interface block 104. The architecture illustrated in FIG. 7C is similar to the architecture shown in FIG. 7B. In FIG. 7C, additional components such as a SoC secure/initialization interface 740, a clock signal generator 742, and a global timer 744 are included.

In the example of FIG. 7C, SoC secure/initialization interface 740 provides a further interface for SoC interface block 104. In one or more embodiments, SoC secure/initialization interface 740 is implemented as a NoC peripheral interconnect. SoC secure/initialization interface 740 is capable of providing access to global reset registers for DPE array 102 (not shown) and to DPE GCS registers 738. In particular embodiments, DPE GCS registers 738 include the configuration registers for clock signal generator 742. As pictured, SoC secure/initialization interface 740 is capable of providing the security bits to DPE GCS registers 738 and propagating the security bits to other DPE GCS registers 738 in other tiles of SoC interface block 104. In particular embodiments, SoC secure/initialization interface 740 implements a single slave endpoint for SoC interface block 104.

In the example of FIG. 7C, clock signal generator 742 is capable of generating one or more clock signal(s) 746 and/or one or more reset signal 750. Clock signal(s) 746 and/or reset signals 750 may be distributed to each of DPEs 204 and/or to other tiles of SoC interface block 104 of DPE array 102. In one or more embodiments, clock signal generator 742 may include one or more phase lock loop circuits (PLLs). As illustrated, clock signal generator 742 is capable of receiving a reference clock signal generated by another circuit external to DPE array 102 and located on the SoC. Clock signal generator 742 is capable of generating the clock signal(s) 746 based upon the received reference clock signal.

In the example of FIG. 7C, clock signal generator 742 is configured through SoC secure/initialization interface 740. For example, clock signal generator 742 may be configured by loading data into DPE GCS registers 738. As such, the clock frequency or clock frequencies of DPE array 102 and the generation of reset signals 750 may be set by writing appropriate configuration data to DPE GCS registers 738 through SoC secure/initialization interface 740. For test purposes, clock signal(s) 746 and/or reset signals 750 may also be routed directly to PL 210.

SoC secure/initialization interface 740 may be coupled to a SoC control/debug (circuit) block (e.g., a control and/or debug subsystem of device 100 not shown). In one or more embodiments, SoC secure/initialization interface 740 is capable of providing status signals to the SoC control/debug block. As an illustrative and non-limiting example, SoC secure/initialization interface 740 is capable of providing a "PLL lock" signal generated from inside of clock signal generator 742 to the SoC control/debug block. The PLL lock signal may indicate when the PLL acquires lock on the reference clock signal. In some examples, an interrupt can be generated by interrupt handler 734 if the PLL does not acquire a lock. In such examples, an output of the clock signal generator 742 is coupled to the interrupt handler.

SoC secure/initialization interface 740 is capable of receiving instructions and/or data via an interface 748. The data may include the security bits described herein, clock signal generator configuration data, and/or other data that may be written to DPE GCS registers 738.

Global timer 744 is capable of interfacing to CDT circuit 720. For example, global timer 744 may be coupled to CDT circuit 720. Global timer 744 is capable of providing a signal that is used by CDT circuit 720 for time-stamping events used for tracing. In one or more embodiments, global timer 744 may be coupled to CDT circuit 720 within other ones of the tiles of SoC interface block 104. For example, global timer 744 may be coupled to CDT circuit 720 in the example tiles of FIGS. 7A, 7B, and/or 7C. Global timer 744 may also be coupled to the SoC control/debug block.

Referring to the architectures of FIGS. 7A, 7B, and 7C collectively, tile 604 is capable of communicating with DPEs 204 using a variety of different data paths. In an example, tile 604 is capable of communicating with DPEs 204 using DMA engine 712. For example, tile 604 is capable of communicating using DMA engine 712 to the DMA engine of one or more DPEs of DPE array 102. Communication may flow from a DPE to a tile of SoC interface block 104 or from a tile of SoC interface block 104 to a DPE. In another example, DMA engine 712 is capable of communicating with a core(s) of one or more DPEs of DPE array 102 by way of the stream switches within the respective DPEs. Communication may flow from core(s) to a tile of SoC interface block 104 and/or from a tile of SoC interface block 104 to core(s) of one or more DPEs of DPE array 102.

As described previously, event logic 404, 424, 732 can detect events that occur in a respective DPE 204 and tile of SoC interface block 104. The detected events can be a basis for some response within the respective DPE 204 or tile of SoC interface block 104 and/or can be broadcast throughout the device 100. The detected events can be broadcast through array components in the DPE array 102 via the event broadcast network (e.g., interconnected event broadcast circuitry 402, 422, 704, 730). At a tile of SoC interface block 104, detected events, whether detected by event logic 732 of the tile of SoC interface block 104 or received via broadcast from another array component of DPE array 102, can be transmitted to the PL interface 710 and to PL interconnect block 722 and then to the PL 210. In other examples, detected events can be transmitted to other circuit blocks, such as other circuit blocks of an ASIC or SoC, via similar interfaces.

The various components that receive a detected event can respond to the detection of the event in a number of ways. FIG. 4 illustrates example logic within the DPE 204 that responds to a detected event. The DPE 204 includes stall logic 440. The stall logic 440 can receive detected events from the event logic 404. The detected events can be generated internally by the event logic 404 and/or received via the event broadcast circuitry 402 from an origination outside of the core 302, such as originating in the memory module 304, another DPE, or a tile of SoC interface block 104. The stall logic 440 can implement logic such that, based on the detected events from the event logic 404 and any other input (e.g., IN1, IN2, IN3, and IN4), the stall logic 440 can generate a signal that stalls execution of the core 302, and possibly stalls other components such as in the memory module 304, under appropriate circumstances. Other inputs into the stall logic 440 can include a collision indication from the memory module 304, signals from the PS 212, signals from stream FIFO memory, etc. Other components that may be stalled include components that control communication of data between the core 302 and memory module 304, for example. As an illustration, since the core 302 is stopped, data "in-flight" from the memory module 304 to the core 302 may be stalled to avoid data loss. Further, components that control reading data (e.g., instructions) from program memory 308 in the core 302 can be stalled. Other components that receive broadcasted detected events can respond in various manners, such as in the PL 210, PS 212, and SoC interface block 104.

Figure 9:
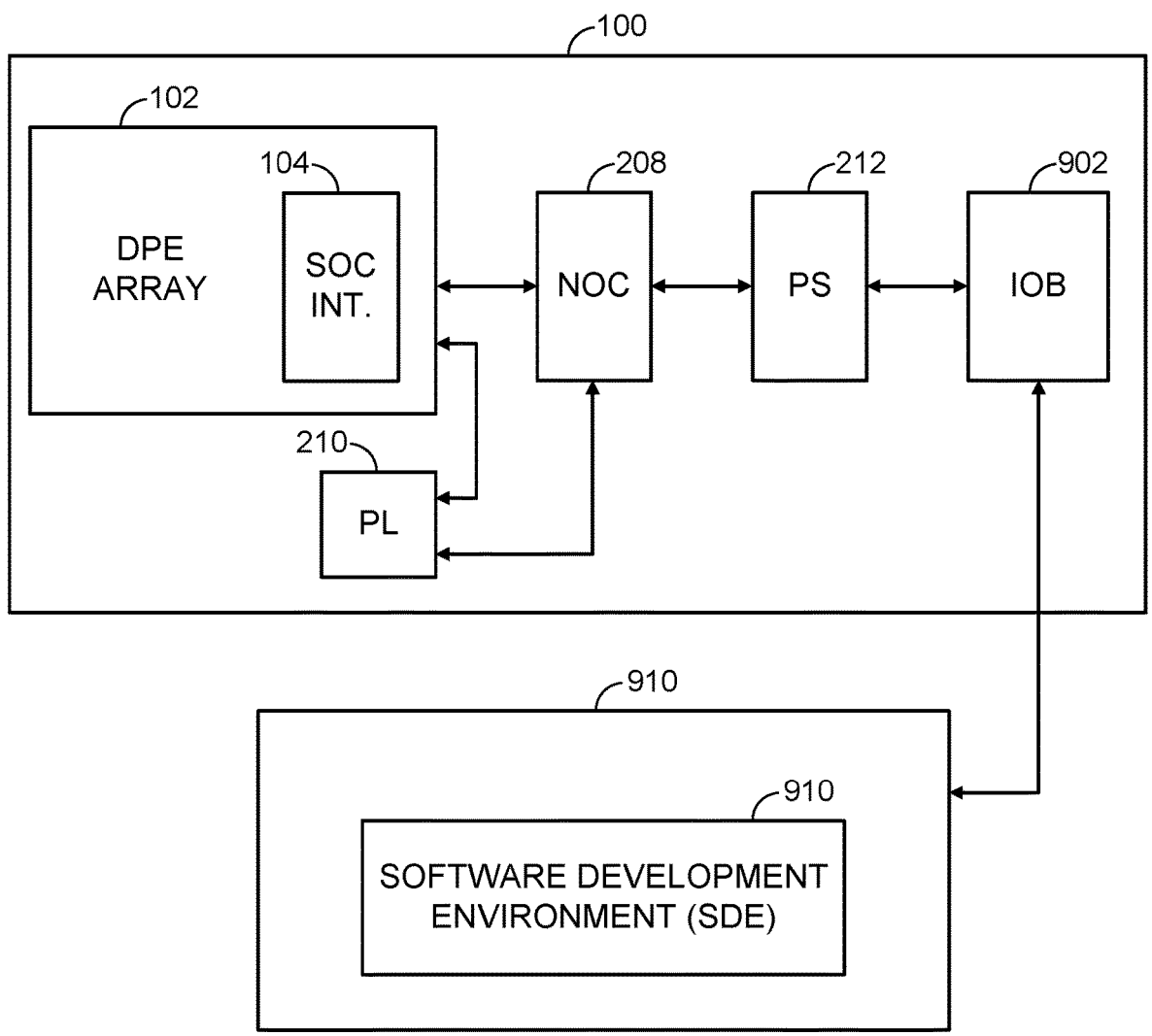
FIG. 9 illustrates an environment for troubleshooting DPEs.

The event logic 404, 424, 732 can further enable troubleshooting the respective DPEs 204 and tiles of SoC interface block 104. Specifically, the event logic 404, 424, 732 can enable debugging, tracing, and profiling. FIG. 9 illustrates an example environment for troubleshooting the DPEs 204. Other environments may be implemented. The environment illustrates the device 100 including the DPE array 102 of DPEs 204 and SoC interface block 104, the NoC 208, the PS 212, the PL 210, and an input/output block (IOB) 902. The DPE array 102 is communicatively coupled to the PL 210, e.g., via the PL interface 710 and PL interconnect block 722 for communicating detected events. Further, the DPE array 102, PS 212, and PL 210 are interconnected via the NoC 208. The PS 212 is communicatively coupled to the IOB 902. The IOB 902 can be a circuit that implements and enables any standard communication protocol or proprietary protocol, for example. In some examples, the IOB 902 implements a Joint Test Action Group (JTAG) protocol. In some examples, the PS 212 may be omitted, and the IOB 902 may be connected to an external memory component (such as external DRAM). The device 100, via the IOB 902, is connected to a host computer system 910 that executes a software development environment (SDE) 912. Through the SDE 912, a user can configure configuration registers 324, 336 in DPEs 204 to enable debugging, tracing, and profiling, as well as interpreting data provided from the device 100 in response to the configuration and operation of the DPEs 204.

The user can define conditions in configuration registers 324, 336, 736 under which the event logic 404, 424, 732 detects events for debugging. The user, via the SDE 912, IOB 902, PS 212 (optionally), and NoC 208, can cause memory mapped transactions to be transmitted to and received by a NoC interface 726 of a tile of SoC interface block 104. The memory mapped transactions can be propagated to the appropriate subset (e.g., column) of the DPE array 102 for respective target DPEs 204 via memory mapped switches 702 in tiles of the SoC interface block 104. For DPEs, at the corresponding subset (e.g., column) of the DPE array 102 for the target DPE 204, the memory mapped switch 702 propagates the memory mapped transaction upward to a DPE 204 neighboring the tile of SoC interface block 104 corresponding to the subset, and DPEs 204 within the subset continue to propagate the memory mapped transaction upward via memory mapped switches 332 until the memory mapped transaction is received by the target DPE 204. At the target DPE 204 and/or target tile of SoC interface block 104, configuration registers 324, 336, 736 can be written and read by the user using memory mapped transactions.

The configuration registers 324 for the stall logic 440 can be defined in the architecture to, e.g., halt execution of the core 302, resume execution of the core 302, set breakpoints, single step instructions, synchronize the timer, etc. as responses to detected events that are identified in and written to the corresponding configuration registers 324. The user can write to the configuration registers 324 using memory mapped transactions as described above to identify the detected events that will trigger the defined responses. The responses can be implemented by the stall logic 440 alone or in combination with the event logic 404, for example. The stall logic 810 of the CDT circuit 720 and configuration registers 736 can be defined and operate similarly.

During debugging, the user can read any memory space (e.g., register) to identify the state of a DPE 204 or tile of SoC interface block 104 using memory mapped transactions as described above. For example, when the execution of the core 302 is halted, the user can read, via memory mapped transactions, status registers maintained by the core 302 (including an indication of why the core 302 was halted), scalar and vector registers of the core 302, a PC 442, registers of the memory module 304 (e.g., status registers of a DMA engine, hardware synchronization circuitry, etc.), and other registers. Hence, the user can identify under what conditions (e.g., events) certain responses occur (e.g., a halt), and can read the state of the DPE 204 or tile of SoC interface block 104 at that response to debug the execution of the DPE 204 or tile of SoC interface block 104.

The user can define conditions in configuration registers 324, 336, 736 under which the event logic 404, 424, 732 detects events for tracing. As described above in the context of debugging, the user can cause memory mapped transactions to write to configuration registers 324, 336, 736 of the core 302 and memory module 304 of a target DPE 204 and tile of SoC interface block 104. The configuration registers 324, 336 for the trace hardware 406, 426 for the core 302 and memory module 304, respectively, can be defined in the architecture to, e.g., start a trace and end a trace, as responses to detected events that are identified in and written to the corresponding configuration registers 324, 336. The user can write to the configuration registers 324, 336 using memory mapped transactions as described above to identify the detected events that will trigger the defined responses. The responses can be implemented by the trace hardware 406, 426 alone or in combination with the event logic 404, 424, for example. The trace hardware 802 of the CDT circuit 720 and configuration registers 736 can be defined and operate similarly.

When an event identified in a corresponding configuration register 324 is detected, internal to the core 302 of the DPE 204 or broadcast from another array component, the detected event can trigger the trace hardware 406 to begin capturing trace data during execution of the core 302. Configuration registers 324 can also be written to define what trace data is captured, the trace mode, how the trace data will be compressed and/or packetized, or other configurations. The trace hardware 406 can capture trace data, which can include a PC 442 and execution trace data, sufficient to trace the execution of the core 302 and can store the trace data to a trace buffer 408 before the trace data is transmitted to other storage. The trace hardware 406 can further include event traces based on information received from the event logic 404.

Similarly, when an event identified in a corresponding configuration register 336 is detected, internal to the memory module 304 of the DPE 204 or broadcast from another array component, the detected event can trigger the trace hardware 426 to begin capturing trace data of accesses to the memory module 304. Configuration registers 336 can also be written to define what trace data is captured, the trace mode, how the trace data will be compressed and/or packetized, or other configurations. The trace hardware 426 can capture trace data, which can include the PC 442, sufficient to trace the access to the memory module 304 and can store the trace data to a trace buffer 428 before the trace data is transmitted to other storage. The trace hardware 426 can further include event traces based on information received from the event logic 424. The trace hardware 802 and trace buffer 804 of the CDT circuit 720 and configuration registers 736 can be defined and operate similarly.

The trace data in the trace buffers 408, 428, 804 can be transmitted and stored in any memory that can be subsequently accessed by a user for analyzing the trace data. In some examples, the trace data in the trace buffers 408, 428 is pushed as packets (as core and memory trace streams) to the stream switch 326 of the DPE interconnect 306 of the DPE 204, which are then routed via stream switches 326 by packet switching to DPEs in the DPE array 102 below the DPE 204 until the packets are received by a stream switch 706 of the tile of SoC interface block 104 in the subset (e.g., column) of the DPE 204. In some examples, the trace data in the trace buffer 804 is pushed as packets to the stream switch 706 of the tile of the SoC interface block 104. The tile of SoC interface block 104 may propagate the trace data to a neighboring tile of SoC interface block 104 until an appropriate tile of SoC interface block 104 having a NoC interface 726 receives the trace data. The NoC interface 726 can translate the trace data into a format for communication via the NoC 208 and transmits the trace data via the NoC 208 to memory, which may be external to the device 100, where the trace data is stored until it is accessed by a user, such as via the SDE 912. In other examples, the trace data may be transmitted to other external interfaces instead of or in addition to memory, such as IO blocks and/or gigabit transceivers (GTs) dedicated to debugging and/or tracing.

The user can define conditions in configuration registers 324, 336, 736 under which the event logic 404, 424, 732 detects events for profiling. As described above in the context of debugging, the user can cause memory mapped transactions to write to configuration registers 324, 336, 736. The configuration registers 324, 336, 736 for the performance counter hardware 410, 430, 806, respectively, can be defined in the architecture to, e.g., start and end a performance counter and reset an internal timer, as responses to detected events that are identified in and written to the corresponding configuration registers 324, 336, 736. The user can write to the configuration registers 324, 336, 736 using memory mapped transactions as described above to identify the detected events that will trigger the defined responses. The responses can be implemented by the performance counter hardware 410, 430, 806 individually or in combination with the event logic 404, 424, 732, respectively, for example.

When an event identified in a corresponding configuration register 324, 336, 736 is detected, internal to the core 302 of the DPE 204, memory module 304 of the DPE 204, or tile of SoC interface block 104, respectively, or broadcast from another array component, the detected event can trigger the performance counter hardware 410, 430, 808 to start one or more of performance counters (e.g., performance counters 412, 432, 808) during some execution, such as of the core 302. Configuration registers 324, 336, 736 can also be written to define what is counted by the performance counters, such as a number of events that occur between a start event and a stop event, the number of clock cycles between a start event and a stop event, or other configurations. Further, the status of the performance counters can cause an event to be detected. The configuration registers 324, 336, 736 of the event logic 404, 424, 732 can identify some status of performance counters as events to be detected. Detection of events related to the performance counters can causes, for example, the performance counter hardware 410, 430, 806 to reset some performance counter. The detected events can further be broadcast like other events described previously.

The profile data in the performance counters can be read using memory mapped transactions like described above and can be stored in any memory that can be subsequently accessed by a user for analyzing the profile data.

FIG. 10 illustrates an example method 1000 of configuring a DPE array. Method 1000 is provided for purposes of illustration and is not intended as a limitation of the example arrangements described within this disclosure.

In block 1002, configuration data for the DPE array is loaded into the device. The configuration data may be provided from any of a variety of different sources, whether a computer system (e.g., a host), an off-chip memory, or other suitable source.

In block 1004, the configuration data is provided to the SoC interface block. In particular embodiments, the configuration data is provided via the NoC. A tile of the SoC interface block is capable of receiving the configuration data and converting the configuration data to memory mapped data, which may be provided to the memory mapped switch contained within the tile.

In block 1006, the configuration data propagates between the tile(s) of the SoC interface block to the particular tile(s) that operate as, or provide, interfaces to the target DPE(s). The target DPE(s) are the DPE(s) to which the configuration data is addressed. For example, the configuration data includes addresses specifying the particular DPEs to which the different portions of configuration data should be directed. The memory mapped switches within the tiles of the SoC interface block are capable of propagating the different portions of configuration data to the particular tiles that operate as interfaces for the target DPE(s) (e.g., the subset of DPEs that include the target DPEs).

In block 91008, the tile(s) of the SoC interface block that operate as interfaces for the target DPE(s) are capable of directing the portions of configuration data for the target DPE(s) to the target DPE(s). For example, a tile that provides an interface to one or more target DPE(s) is capable of directing the portion(s) of configuration data into the subset of DPEs to which the tile provides an interface. As noted, the subset of DPEs includes the one or more target DPE(s). As each tile receives configuration data, the tile is capable of determining whether any portions of the configuration data are addressed to other DPEs in the same subset of DPEs to which the tile provides an interface. The tile directs any configuration data addressed to DPEs in the subset of DPEs to such DPE(s).

In block 1010, the configuration data is loaded into the target DPEs to program the elements of the DPEs included therein. For example, the configuration data is loaded into configuration registers to program elements of the target DPE(s) such as the stream interfaces, the core (e.g., stream interface(s), cascade interfaces, core interfaces), the memory module (e.g., DMA engines, memory interfaces, arbiters, etc.), the broadcast event switch, and/or the broadcast logic. The configuration data may also include executable program code that may be loaded into the program memory of the core and/or data to be loaded into memory banks of the memory module.

It should be appreciated that the received configuration data may also include portions that are addressed to one or more or all of the tiles of SoC interface block 104. In that case, the memory mapped switches within the respective tiles are capable of conveying the configuration data to the appropriate (e.g., target) tiles, extracting such data, and writing such data to the appropriate configuration registers within the respective tiles.

FIG. 11 illustrates an example method 1100 of operating a device that includes a DPE array. Method 1100 is provided for purposes of illustration and is not intended as a limitation of the example arrangements described within this disclosure.

In block 1102, operation of the DPE array is initiated, such as by operating one or more kernels on one or more respective subsets of the DPE array. The DPEs of the DPE array can be configured as described in FIG. 10 to execute the one or more kernels and to configure event logic, event broadcast circuitry, etc. as previously described.

In block 1104, an occurrence of an event is detected by event logic in an array component (e.g., DPE or tile of SoC interface block 104) of the DPE array. As described above, the configuration of the array component may determine what events can be detected during operation of the array component. For a DPE, the events may be detected from the core, from the memory module, or from both the core and the memory module. The event logic within the tile(s) of the SoC interface block can optionally generate events.

In block 1106, optionally, an indication of the detected event is broadcast through the event broadcast network to various other DPEs, and possibly, to the SoC interface block and PL of the device. The event broadcast circuitry within array components broadcasts events based upon the configuration data loaded into the respective array component. The broadcast circuitry is capable of broadcasting selected ones of the events generated in block 1104. The event broadcast circuitry is also capable of broadcasting selected events that may be received from one or more other DPEs within DPE array 102.

For example, the events from DPEs are propagated to tiles within the SoC interface block. For example, events may be propagated in each of the four cardinal directions through the DPEs in patterns and/or routes determined by the configuration data. Broadcast circuitry within particular DPEs may be configured to propagate events down to the tile(s) in the SoC interface block. The tile(s) of the SoC interface block optionally broadcast events to other tiles within the SoC interface block. The broadcast circuitry within the tile(s) of the SoC interface block is capable of broadcasting selected ones of the events generated with the tiles themselves and/or events received from other sources (e.g., whether other tiles of the SoC interface block or DPEs) to other tiles of the SoC interface block.

In block 1108, a response is initiated to the detected event. The response can be in the DPE that detected the event or in another array component (e.g., DPE or tile of SoC interface block). Example responses include a debug operation as in block 1110, a trace operation as in block 1112, and a profile operation 1114, where examples of each are described above.

For example, the tile(s) of the SoC interface block can optionally generate one or more interrupts. The interrupt(s) may be generated by interrupt handler 734, for example. The interrupt handler is capable of generating one or more interrupts in response to receiving particular events, combinations of events, and/or sequences of events over time. The interrupt handler may send the interrupt(s) generated to other circuitry such as PS 212 and/or to circuits implemented within PL 210. In an example, in response to the interrupt, PS 212 is capable of executing a debugger application that is capable of performing actions such as starting, stopping, and/or single-stepping execution of DPEs. PS 212 may control the starting, stopping, and/or single-stepping of DPEs via NoC 208. In other examples, circuits implemented in PL 210 may also be capable of controlling operation of DPEs using debugging operations.

The tile(s) of the SoC interface block can optionally send the events to one or more other circuits. For example, CDT circuit 720 is capable of packetizing events and sending the events from the tile(s) of the SoC interface block to the PS 212, to circuits within the PL 210, to external memory, or to another destination with the SoC.

For purposes of explanation, specific nomenclature is set forth to provide a thorough understanding of the various example concepts disclosed herein. The terminology used herein, however, is for the purpose of describing particular aspects of the example arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

The flowchart and block diagrams in the Figures illustrate the architecture, functionality, and operation of possible implementations of systems, devices, and/or methods according to various aspects of the example arrangements. In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow.

The corresponding structures, materials, acts, and equivalents of all means or step plus function elements that may be found in the claims below are intended to include any structure, material, or act for performing the function in combination with other claimed elements as specifically claimed.

The description of the example arrangements provided herein is for purposes of illustration and is not intended to be exhaustive or limited to the form and examples disclosed. The terminology used herein was chosen to explain the principles of the example arrangements, the practical application or technical improvement over technologies found in the marketplace, and/or to enable others of ordinary skill in the art to understand the example arrangements disclosed herein. Modifications and variations may be apparent to those of ordinary skill in the art without departing from the scope and spirit of the described example arrangements. Accordingly, reference should be made to the following claims, rather than to the foregoing disclosure, as indicating the scope of such features and implementations.

What is claimed is:

1. A device comprising:
    an array of data processing engines (DPEs) on a die, each of the DPEs comprising:
        a core;
        a memory module;
        event logic in at least one of the core or the memory module, the event logic being configurable to detect an occurrence of a plurality of types of events in the core or the memory module; and
        an event broadcast circuitry coupled to the event logic and configured to receive an indication of a detected event detected by the event logic; and
    an event broadcast network comprising interconnections between the event broadcast circuitry of the DPEs.

2. The device of claim 1, wherein, for each of the DPEs, the event broadcast circuitry is configurable, based on writable configuration registers, to identify which identified ones of the plurality of types of events are to be broadcast in the event broadcast network upon receipt, by the event broadcast circuitry, of a respective indication of a detected event corresponding to a respective type in the identified ones of the plurality of types of events.

3. The device of claim 1, wherein, for each of the DPEs, the event broadcast circuitry is configurable, based on writable configuration registers, to selectively broadcast a received indication of a detected event in one or more distinct directions based on which of the one or more distinct directions the received indication was received from the event broadcast network.

4. The device of claim 1, wherein, for each of the DPEs, the event logic is configurable, based on writable configuration registers, to define conditions under which the event logic detects the occurrence of the events.

5. The device of claim 1, wherein, for each of the DPEs:
    the event logic includes:
        first event logic in the core, the first event logic being configurable to detect an occurrence of a plurality of types of core events in the core; and
        second event logic in the memory module, the second event logic being configurable to detect an occurrence of a plurality of types of memory events in the memory module;
    the event broadcast circuitry includes:
        a first event broadcast circuitry connected to the first event logic and configured to receive an indication of a detected event detected by the first event logic; and
        a second event broadcast circuitry connected to the second event logic and configured to receive an indication of a detected event detected by the second event logic;
    the first event broadcast circuitry is connected to the second event broadcast circuitry;
    when a respective DPE has a first neighboring DPE above the respective DPE in the array, the first event broadcast circuitry of the respective DPE is connected to the first event broadcast circuitry of the first neighboring DPE, and the second event broadcast circuitry of the respective DPE is connected to the second event broadcast circuitry of the first neighboring DPE;

when the respective DPE has a second neighboring DPE below the respective DPE in the array, the first event broadcast circuitry of the respective DPE is connected to the first event broadcast circuitry of the second neighboring DPE, and the second event broadcast circuitry of the respective DPE is connected to the second event broadcast circuitry of the second neighboring DPE;

when the respective DPE has a third neighboring DPE disposed laterally next to the respective DPE in the array, one of the first event broadcast circuitry or the second event broadcast circuitry of the respective DPE is connected to one of the first event broadcast circuitry or the second event broadcast circuitry of the third neighboring DPE; and when the respective DPE has a fourth neighboring DPE disposed laterally next to the respective DPE and opposite from the third neighboring DPE in the array, the other one of the first event broadcast circuitry or the second event broadcast circuitry of the respective DPE is connected to one of the first event broadcast circuitry or the second event broadcast circuitry of the fourth neighboring DPE.

6. The device of claim 1, wherein each of the DPEs further comprises response logic coupled to the event logic, the response logic being configurable by writable configuration registers, the response logic being operable to trigger a response based upon the writable configuration registers and one or more detected events detected by the event logic.

7. The device of claim 6, wherein, for each of the DPEs, the response logic comprises stall logic operable to halt and resume execution of the core based on the writable configuration registers and the one or more detected events detected by the event logic.

8. The device of claim 6, wherein, for each of the DPEs, the response logic comprises trace hardware operable to capture trace data based on the writable configuration registers and the one or more detected events detected by the event logic.

9. The device of claim 6, wherein, for each of the DPEs, the response logic comprises performance counter hardware operable to operate one or more performance counters based on the writable configuration registers and the one or more detected events detected by the event logic.

10. A method for operating a device, the method comprising:
    operating a plurality of data processing engines (DPEs) of an array of DPEs on a die, each of the plurality of DPEs comprising a core and a memory module;
    during operation of a first DPE of the plurality of DPEs, detecting an occurrence of an event in the core or the memory module of the first DPE by event logic in the first DPE, the event logic being configurable to detect a plurality of types of events that occur in the core or the memory module; and
    broadcasting an indication of the detected event from the first DPE to at least a second DPE of the plurality of DPEs via an event broadcast network, the event broadcast network comprising interconnected event broadcast circuitry of the plurality of DPEs.

11. The method of claim 10, wherein the event logic is configured to detect the event based on data written to one or more configuration registers.

12. The method of claim 10, wherein the event broadcast circuitry are each configured to propagate signals based on data written to one or more configuration registers.

13. The method of claim 10, wherein each of the DPEs in the array of DPEs includes a first event broadcast circuitry and a second event broadcast circuitry in the respective DPE, wherein the interconnected event broadcast circuitry include, for each of the DPEs in the array of DPEs:

the first event broadcast circuitry of the respective DPE is connected to the second event broadcast circuitry of the respective DPE;

when a respective DPE has a first neighboring DPE above the respective DPE in the array, the first event broadcast circuitry of the respective DPE is connected to the first event broadcast circuitry of the first neighboring DPE, and the second event broadcast circuitry of the respective DPE is connected to the second event broadcast circuitry of the first neighboring DPE;

when the respective DPE has a second neighboring DPE below the respective DPE in the array, the first event broadcast circuitry of the respective DPE is connected to the first event broadcast circuitry of the second neighboring DPE, and the second event broadcast circuitry of the respective DPE is connected to the second event broadcast circuitry of the second neighboring DPE;

when the respective DPE has a third neighboring DPE disposed laterally next to the respective DPE in the array, one of the first event broadcast circuitry or the second event broadcast circuitry of the respective DPE is connected to one of the first event broadcast circuitry or the second event broadcast circuitry of the third neighboring DPE; and when the respective DPE has a fourth neighboring DPE disposed laterally next to the respective DPE and opposite from the third neighboring DPE in the array, the other one of the first event broadcast circuitry or the second event broadcast circuitry of the respective DPE is connected to one of the first event broadcast circuitry or the second event broadcast circuitry of the fourth neighboring DPE.

14. The method of claim 10 further comprising triggering a response by response logic of at least one of the first DPE or the second DPE based upon the detected event.

15. The method of claim 14, wherein the response is performing a debugging operation, a tracing operation, a profiling operation, or a combination thereof.

16. A device comprising:
    an array of data processing engines (DPEs) on a die, each of the DPEs comprising:
    a core;
    a memory module;
    core event logic in the core, the core event logic being configurable to detect an occurrence of first one or more events in the core, the first one or more events being defined by data written to first one or more configuration registers;
    memory event logic in the memory module, the memory event logic being configurable to detect an occurrence of second one or more events in the memory module, the second one or more events being defined by data written to second one or more configuration registers; and
    a first event broadcast circuitry connected to the core event logic, the first event broadcast circuitry being configurable to selectively propagate a first received signal based on data written to third one or more configuration registers, the first event broadcast circuitry further being configurable to propagate the first received signal selectively in one or more predefined directions based on data written to the third one or more configuration registers;

a second event broadcast circuitry connected to the memory event logic, the first event broadcast circuitry being connected to the second event broadcast circuitry, the second event broadcast circuitry being configurable to selectively propagate a second received signal based on data written to fourth one or more configuration registers, the second event broadcast circuitry further being configurable to propagate the second received signal selectively in one or more predefined directions based on data written to the fourth one or more configuration registers; and wherein the first event broadcast circuitry and the second event broadcast circuitry of the DPEs are interconnected to form an event broadcast network.

17. The device of claim 16 further comprising a system interface block comprising a plurality of tiles, each of the plurality of tiles being connected to and configured to operate as an interface for a column of DPEs of the array of DPEs, the system interface block being connected to the event broadcast network.

18. The device of claim 17 further comprising:
a system network connected to the system interface block;
programmable logic connected to the system network and to the system interface block, wherein the event broadcast network and the system interface block are configurable to transmit an indication of an event detected by at least one of the core event logic or the memory event logic of the DPEs to the programmable logic; and
a processing system connected to the system network.

19. The device of claim 16, wherein each of the DPEs further comprises:
stall logic coupled to the core event logic and configurable to halt execution of the core upon receipt of an indication of a detected event from the core event logic;
first trace hardware coupled to the core event logic and configurable to capture core trace data upon receipt of an indication of a detected event from the core event logic; and
first performance counter hardware coupled to the core event logic and configurable to control a core performance counter upon receipt of an indication of a detected event from the core event logic.

20. The device of claim 19, wherein each of the DPEs further comprises:
second trace hardware coupled to the memory event logic and configurable to capture memory trace data upon receipt of an indication of a detected event from the memory event logic; and
second performance counter hardware coupled to the memory event logic and configurable to control a memory performance counter upon receipt of an indication of a detected event from the memory event logic.

* * * * *

UNITED STATES PATENT AND TRADEMARK OFFICE
CERTIFICATE OF CORRECTION

| | | |
|---|---|---|
| PATENT NO. | : 11,567,881 B1 | Page 1 of 1 |
| APPLICATION NO. | : 15/944602 | |
| DATED | : January 31, 2023 | |
| INVENTOR(S) | : Goran H. K. Bilski | |

It is certified that error appears in the above-identified patent and that said Letters Patent is hereby corrected as shown below:

In the Claims

Column 38, Line 63, In Claim 16, after "registers;" delete "and".

Column 39, Line 05, In Claim 16, after "registers;" insert -- and --.

Signed and Sealed this
Nineteenth Day of September, 2023

*Katherine Kelly Vidal*

Katherine Kelly Vidal
*Director of the United States Patent and Trademark Office*